United States Patent
Fujii et al.

(10) Patent No.: US 7,583,340 B2
(45) Date of Patent: Sep. 1, 2009

(54) PHASE DIFFERENCE COMPENSATING DEVICE AND LIQUID CRYSTAL APPARATUS USING THE SAME

(75) Inventors: Takamichi Fujii, Kanagawa-ken (JP); Kenichi Nakagawa, Fujinomiya (JP)

(73) Assignee: FUJIFILM Corporation, Tokyo (JP)

(*) Notice: Subject to any disclaimer, the term of this patent is extended or adjusted under 35 U.S.C. 154(b) by 171 days.

(21) Appl. No.: 11/254,685

(22) Filed: Oct. 21, 2005

(65) Prior Publication Data
US 2006/0092358 A1 May 4, 2006

(30) Foreign Application Priority Data
Oct. 22, 2004 (JP) ............... 2004-308297

(51) Int. Cl.
*G02F 1/1335* (2006.01)
(52) U.S. Cl. ............... 349/117; 349/119; 349/5
(58) Field of Classification Search ........... 349/125, 349/117–121, 5
See application file for complete search history.

(56) References Cited

U.S. PATENT DOCUMENTS

| | | | |
|---|---|---|---|
| 5,196,953 A * | 3/1993 | Yeh et al. ............... 349/119 |
| 5,559,617 A * | 9/1996 | Mitsui et al. ............ 349/117 |
| 5,571,612 A * | 11/1996 | Motohiro et al. ........ 428/323 |
| 5,612,801 A * | 3/1997 | Winker .................. 349/119 |
| 5,638,197 A * | 6/1997 | Gunning et al. ......... 349/96 |
| 5,932,354 A * | 8/1999 | Takeda et al. ........... 428/426 |
| 5,978,055 A | 11/1999 | Van De Witte et al. |
| 7,079,209 B2 * | 7/2006 | Nakagawa .............. 349/119 |

FOREIGN PATENT DOCUMENTS

JP 8-122523 A 5/1996
JP 2004-102200 A 4/2004

OTHER PUBLICATIONS

Tomoyoshi Motohiro and Y. Taga "Thin film retardation plate by oblique deposition" Applied Optics, vol. 28, No. 13, pp. 2466-2482, Jul. 1, 1989.*
Hiroyuki Mori, et al., "Development of Wide View SA, a Film Product Widening the Viewing Angle of LCDs", Fujifilm Research & Development, pp. 51-55, No. 46-2001.

* cited by examiner

Primary Examiner—Mike Qi
(74) Attorney, Agent, or Firm—Sughrue Mion, PLLC

(57) ABSTRACT

A transparent base plate supports a first compensating layer, which is adapted to compensate for a phase difference due to liquid crystal molecules having undergone normal orientation in a liquid crystal layer of a TN liquid crystal display device, and second compensating layers, which are adapted to compensate for the phase difference due to the liquid crystal molecules having undergone hybrid orientation in the liquid crystal layer. Each of the second compensating layers is constituted of one of oblique incidence vacuum deposited films, which are formed on opposite surfaces of the base plate with oblique incidence vacuum evaporation of an inorganic material. An azimuthal angle and/or a polar angle of a direction of vacuum evaporation with respect to a plane of vacuum evaporation is set to be different between the second compensating layers.

20 Claims, 9 Drawing Sheets

FIG.10

[TN LIQUID CRYSTAL: d=4.5μm]

| WAVE LENGTH (nm) | BIREFRINGENT INDEX Δn OF TN LIQUID CRYSTAL (Δn) | (dΔn)LC | Re 0.7×(dΔn)LC |
|---|---|---|---|
| 400 | 0.1360 | 612 | 428 |
| 450 | 0.1310 | 590 | 413 |
| 500 | 0.1270 | 572 | 400 |
| 550 | 0.1240 | 558 | 391 |
| 600 | 0.1210 | 545 | 381 |
| 650 | 0.1190 | 536 | 375 |
| 700 | 0.1180 | 531 | 372 |

FIG.11

[FIRST PHASE DIFFERENCE COMPENSATING LAYER: d1=2μm]

| WAVE LENGTH (nm) | REFRACTIVE INDEX OF TiO$_2$ FILM | REFRACTIVE INDEX OF SiO$_2$ FILM | EFFECTIVE REFRACTIVE INDEX | | Δn1 | dΔn1 (nm) |
| | | | TE WAVE | TM WAVE | | |
|---|---|---|---|---|---|---|
| 400 | 2.5530 | 1.480 | 2.188 | 1.908 | 0.280 | 561 |
| 450 | 2.4492 | 1.476 | 2.114 | 1.877 | 0.237 | 474 |
| 500 | 2.3783 | 1.472 | 2.064 | 1.855 | 0.209 | 418 |
| 550 | 2.3404 | 1.470 | 2.037 | 1.842 | 0.195 | 390 |
| 600 | 2.3095 | 1.468 | 2.015 | 1.832 | 0.184 | 368 |
| 650 | 2.2885 | 1.467 | 2.001 | 1.824 | 0.177 | 354 |
| 700 | 2.2735 | 1.465 | 1.990 | 1.819 | 0.171 | 342 |

FIG.12

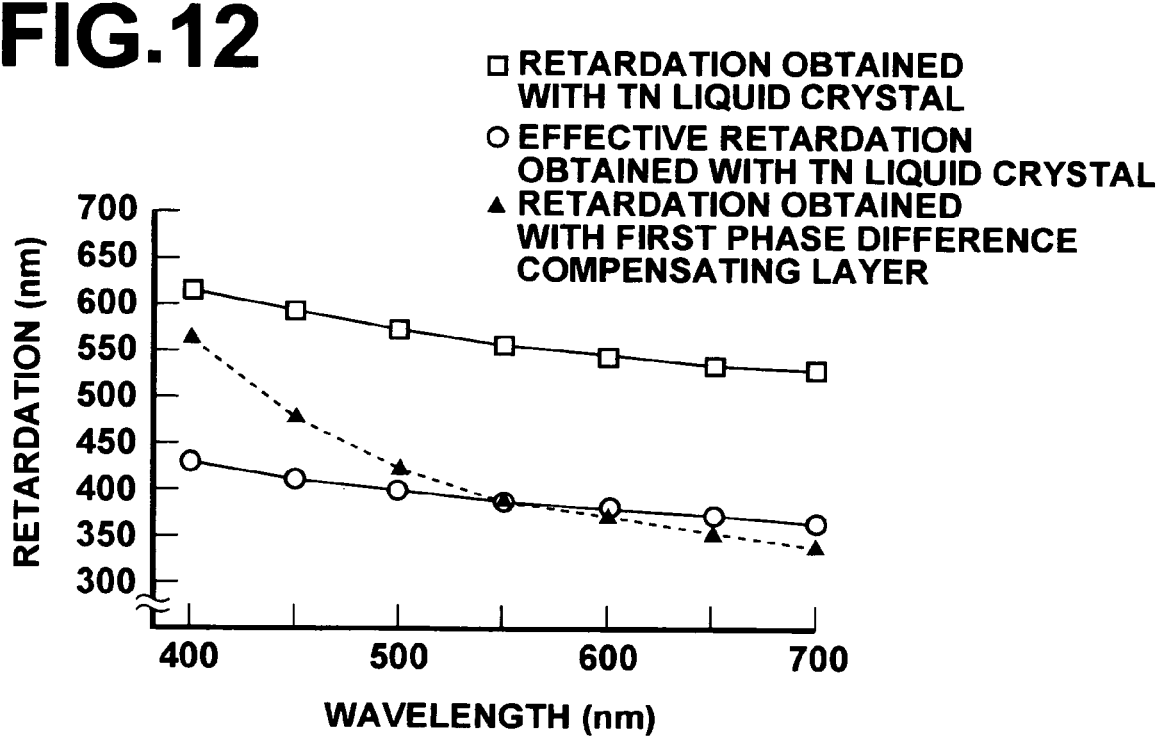

□ RETARDATION OBTAINED WITH TN LIQUID CRYSTAL
○ EFFECTIVE RETARDATION OBTAINED WITH TN LIQUID CRYSTAL
▲ RETARDATION OBTAINED WITH FIRST PHASE DIFFERENCE COMPENSATING LAYER

FIG.13

[IMPROVEMENT OF FIRST PHASE DIFFERENCE COMPENSATING LAYER]

| WAVE LENGTH (nm) | Re OF TN LIQUID CRYSTAL | THICKNESS $d1$ ($\mu$m) OF FIRST PHASE DIFFERENCE COMPENSATING LAYER | $d1 \Delta n1$ | |
|---|---|---|---|---|
| 400 | 428 | | 504 | FIRST PHASE DIFFERENCE COMPENSATING LAYER FOR BLUE LIGHT |
| 450 | 413 | 1.8 | 426 | |
| 500 | 400 | | 376 | |
| 500 | 400 | | 418 | FIRST PHASE DIFFERENCE COMPENSATING LAYER FOR GREEN LIGHT |
| 550 | 391 | 2.0 | 390 | |
| 600 | 381 | | 368 | |
| 600 | 381 | | 386 | FIRST PHASE DIFFERENCE COMPENSATING LAYER FOR RED LIGHT |
| 650 | 375 | 2.1 | 371 | |
| 700 | 372 | | 359 | |

PHASE DIFFERENCE COMPENSATING DEVICE AND LIQUID CRYSTAL APPARATUS USING THE SAME

BACKGROUND OF THE INVENTION

1. Field of the Invention

This invention relates to a phase difference compensating device for eliminating the problems from occurring in that, in cases where an image displayed on an image display device utilizing a twisted nematic liquid crystal (hereinbelow referred to as the TN liquid crystal) is seen, image contrast becomes low in accordance with an field of view. This invention also relates to a liquid crystal apparatus, such as a liquid crystal projector, using the phase difference compensating device.

2. Description of the Related Art

Liquid crystal display devices operating in various different operation modes have heretofore been known. In particular, for the advantages with regard to mass production, the TN liquid crystal display devices have become popular as image display devices of direct viewing types of flat panel display apparatuses and liquid crystal projectors. The TN liquid crystal display devices comprise a pair of transparent base plates, on each of which a transparent electrode and an orientating film have been formed, and rod-shaped liquid crystal molecules, which constitute a liquid crystal layer and have been filled between the pair of the transparent base plates. The liquid crystal molecules are kept such that the major axes of the liquid crystal molecules are parallel with the base plates, such that the directions of the major axes of the liquid crystal molecules are tilted little by little over the thickness direction of the liquid crystal layer, and such that the liquid crystal molecules are set in a state of an orientation twisted by an angle of 90° as a whole.

In the state in which the liquid crystal molecules are thus orientated in the liquid crystal layer, linearly polarized light may be caused to impinge upon the liquid crystal layer from the side of one of the base plates. In such cases, during the travel of the linearly polarized light through the liquid crystal layer toward the other base plate, the direction of polarization of the linearly polarized light is rotated by an angle of 90° in accordance with the state of orientation of the liquid crystal molecules. The linearly polarized light, whose direction of polarization has thus been rotated by an angle of 90°, is radiated out from the liquid crystal layer.

Also, in cases where a voltage is applied across the liquid crystal layer, the aforesaid twisted orientation of the liquid crystal molecules is lost, and the liquid crystal molecules are set in a state of orientation, in which the major axes of the majority of the liquid crystal molecules are erected in the direction normal to the base plate. In this state, the linearly polarized light may be caused to impinge upon the liquid crystal layer from the side of one of the base plates. In such cases, the linearly polarized light is radiated out from the liquid crystal layer in the state, in which the direction of polarization of the linearly polarized light is not altered.

A pair of polarizing plates may be located on the light incidence side and the light radiating side of the TN liquid crystal display device, such that the directions of polarization may be normal to each other. (The aforesaid location of the polarizing plates is referred to as the crossed Nicols arrangement.) In such cases, in the state in which the voltage is not applied across the liquid crystal layer, the direction of polarization of the linearly polarized light, which has passed through the polarizing plate located on the light incidence side of the TN liquid crystal display device and has impinged upon the liquid crystal layer, is rotated by an angle of 90° by the effect of the liquid crystal molecules. Therefore, in such cases, the linearly polarized light is radiated out from the polarizing plate located on the light radiating side of the TN liquid crystal display device, and the TN liquid crystal display device is thus set in a bright state. (The aforesaid operation mode of the TN liquid crystal display device is referred to as the normally white mode.) Also, in the state in which the voltage is applied across the liquid crystal layer, the direction of polarization of the linearly polarized light, which has passed through the polarizing plate located on the light incidence side of the TN liquid crystal display device and has impinged upon the liquid crystal layer, is kept without being altered. Therefore, in such cases, the linearly polarized light is blocked by the polarizing plate located on the light radiating side of the TN liquid crystal display device, and the TN liquid crystal display device is thus set in a dark state.

Also, a pair of polarizing plates may be located on the light incidence side and the light radiating side of the TN liquid crystal display device, such that the directions of polarization may be parallel with each other. (The aforesaid location of the polarizing plates is referred to as the parallel Nicols arrangement.) In such cases, in the state in which the voltage is not applied across the liquid crystal layer, the TN liquid crystal display device is set in the dark state. (The aforesaid operation mode of the TN liquid crystal display device is referred to as the normally black mode.) Further, in the state in which the voltage is applied across the liquid crystal layer, the TN liquid crystal display device is set in the bright state. The TN liquid crystal display device is also capable of being operated in the normally black mode.

Ordinarily, the TN liquid crystal display device has the drawbacks in that the field of view is narrow. The aforesaid drawbacks of the TN liquid crystal display device arise since the liquid crystal molecules act also as birefringent media. By way of example, in the cases of the TN liquid crystal display device of the normally white mode, at the stage at which the voltage is applied across the liquid crystal layer, and at which the twisted orientation of the liquid crystal molecules is thereby lost, both the optical rotatory power and the birefringent characteristics prevail. As the applied voltage becomes high, the birefringent characteristics become dominant. Also, at the time at which the twisted orientation of the liquid crystal molecules has been lost, and at which the TN liquid crystal display device is thus set in the dark state, the liquid crystal layer exhibits little birefringent characteristics with respect to normal incident light, and therefore the linearly polarized light, which impinges upon the liquid crystal layer from the normal direction, directly passes through the liquid crystal layer. However, at the time at which the twisted orientation of the liquid crystal molecules has been lost, and at which the TN liquid crystal display device is thus set in the dark state, the liquid crystal layer exhibits the birefringent characteristics with respect to oblique incident light, and therefore the linearly polarized light, which impinges upon the liquid crystal layer from the oblique direction, is modulated into elliptically polarized light. Part of the elliptically polarized light, which has thus been produced, passes through the polarizing plate, which is located on the light radiating side of the TN liquid crystal display device. As a result, the extent of the dark state of the TN liquid crystal display device becomes low. The characteristics of the liquid crystal layer acting as the birefringent medium occur little by little also at the stage of transfer from the bright state to the dark state of the TN liquid crystal display device. Therefore, in the state in which a continuous tone image is displayed, in cases where the display screen is seen from an oblique direction, dependence of a modulation degree upon the angle is not capable of being avoided.

In cases where the TN liquid crystal display device is employed as the image display device of the direct viewing type of the flat panel display apparatus, the aforesaid field angle characteristics of the TN liquid crystal display device cause a phenomenon to occur in that a black image density and a tint vary for different directions of seeing. Also, in cases where the TN liquid crystal display device is employed as the image display device of the liquid crystal projector, the aforesaid field angle characteristics of the TN liquid crystal display device cause a phenomenon to occur in that the contrast of the image projected onto a screen becomes low. In both the cases described above, the aforesaid field angle characteristics of the TN liquid crystal display device cause the image quality of the displayed image to become markedly low.

The aforesaid drawbacks of the TN liquid crystal display device are capable of being suppressed by the utilization of a multi-layer thin film comprising a thin film constituted of a high refractive index material and a thin film constituted of a low refractive index material, which thin films are laminated alternately, such that an optical film thickness falls within the range of one-hundredth of light wavelengths to one-fifth of light wavelengths. (The aforesaid multi-layer thin film is described in, for example, Japanese Unexamined Patent Publication No. 2004-102200.) The aforesaid multi-layer thin film has negative C-plate characteristics. In cases where the linearly polarized light impinges from an oblique direction upon the liquid crystal layer, in which the liquid crystal molecules take a normal orientated attitude for dark state displaying, and the linearly polarized light is thus subjected to the birefringence, the aforesaid multi-layer thin film acts as a negative uniaxial birefringent material, which compensates for a phase difference between ordinary rays and extraordinary rays in accordance with the angle of incidence of the linearly polarized light. Therefore, with the multi-layer thin film described above, the elliptically polarized light having been produced due to the birefringence is returned to the linearly polarized light, and the problems are capable of being prevented from occurring in that leak light is radiated out from the post-stage polarizing plate. Also, the aforesaid multi-layer thin film acting as the phase difference compensating device has the feature in that the multi-layer thin film is capable of being constituted of inorganic materials. The aforesaid multi-layer thin film has a high heat resistance, a high light resistance, a high physical stability, and a high chemical stability. Accordingly, the aforesaid multi-layer thin film is capable of being utilized efficiently for the direct viewing types of the flat panel display apparatuses and the liquid crystal projectors.

Further, it has been known that an O-plate is efficient for improvement of the field angle characteristics of the TN liquid crystal display device. (The efficiency of the O-plate is described in, for example, U.S. Pat. No. 5,638,197.) The O-plate is a birefringent material, in which the main optic axis, which does not cause the birefringence to occur, is tilted with respect to a reference surface (e.g., the base plate surface of the liquid crystal display device). In U.S. Pat. No. 5,638,197, it is also disclosed that the O-plate is capable of being produced easily with an oblique incidence vacuum evaporation technique, in which an inorganic material is vacuum deposited from an oblique direction with respect to the base plate, and that the O-plate may be utilized in combination with the C-plate or an A-plate.

Furthermore, each of WV film (trade name) and WV-SA film (trade name) has been used in practice. (Each of the WV film and the WV-SA film is described in, for example, "Development of Wide View SA, a Film Product Widening the Viewing Angle of LCDs" by Hiroyuki Mori, et al., FUJIFILM RESEARCH & DEVELOPMENT, No. 46-2001, pp. 51-55.) Each of the WV film and the WV-SA film comprises a TAC film, which acts as a base, and a disk-shaped liquid crystal compound, which is fixed in a state of hybrid orientation to the TAC film. With each of the WV film and the WV-SA film, in cases where the dark state displaying is performed, the majority of the liquid crystal molecules, which are distributed in the thickness direction of the liquid crystal layer, take the normal orientated attitude, and the liquid crystal molecules, which are located in a region close to the base plate, undergo a hybrid orientation such that the major axes of the liquid crystal molecules are erected little by little from the orientated attitude, which is approximately parallel with the base plate. With the birefringent material described in Japanese Unexamined Patent Publication No. 2004-102200, the phase difference compensation is not perfect with respect to the birefringence due to the liquid crystal molecules, which are located in the region close to the base plate. However, with each of the WV film and the WV-SA film, wherein the disk-shaped liquid crystal compound undergoes the hybrid orientation, efficient phase difference compensation is capable of being performed also with respect to the birefringence due to the liquid crystal molecules, which are located in the region close to the base plate.

As one of techniques for producing a phase difference compensating device constituted of an inorganic material, there has been proposed a technique, wherein an oblique incidence vacuum deposited film is formed with oblique incidence vacuum evaporation of the inorganic material onto a base plate, and wherein the thus formed oblique incidence vacuum deposited film is utilized as a phase difference compensating layer. (The aforesaid technique for producing a phase difference compensating device constituted of an inorganic material is disclosed in, for example, each of Japanese Unexamined Patent Publication No. 8 (1996)-122523 and U.S. Pat. No. 5,932,354.)

As described above, with the phase difference compensating device described in Japanese Unexamined Patent Publication No. 2004-102200, in cases where the dark state displaying is performed by use of the TN liquid crystal display device in the normally white mode, as for the majority of the liquid crystal molecules, which are orientated in the normal direction within the liquid crystal layer, the phase difference compensation is made appropriately with respect to the light beam incident from the oblique direction. However, with the phase difference compensating device described in Japanese Unexamined Patent Publication No. 2004-102200, the problems are encountered in that, in such cases, as for the liquid crystal molecules, which undergo the hybrid orientation in the region close to the base plate, the phase difference compensation is not perfect, and in that an improvement need be made even further.

The O-plate described in U.S. Pat. No. 5,638,197 is constituted of the single-layer, oblique incidence vacuum deposited film. However, in order for the O-plate to be used in practice, a study need be made even further with regard to how the structure of the oblique incidence vacuum deposited film is to be optimized for obtaining the desired field angle characteristics in cases where the O-plate is utilized alone or in combination with the C-plate, or the like.

Each of the WV film and the WV-SA film described in "Development of Wide View SA, a Film Product Widening the Viewing Angle of LCDs" by Hiroyuki Mori, et al., FUJIFILM RESEARCH & DEVELOPMENT, No. 46-2001, pp.

51-55 is capable of performing efficient phase difference compensation. However, each of the WV film and the WV-SA film is principally constituted of an organic material, and therefore has the problems with regard to the durability. In cases where each of the WV film and the WV-SA film is exposed for a long period of time to strong light containing ultraviolet light, each of the WV film and the WV-SA film is apt to suffer from color fading. Particularly, in cases where each of the WV film and the WV-SA film is utilized for the liquid crystal projectors, since the luminance of the light source is set to be high for the image projection onto the screen, and since the extent of heating becomes high, the problems occur in that browning occurs little by little during a use period of approximately 2,000 hours to 3,000 hours.

In order for the aforesaid problems to be eliminated, it will be desired that the phase difference compensating device, which is described in Japanese Unexamined Patent Publication No. 2004-102200, be imparted with the hybrid orientation. However, the phase difference compensating device made from the inorganic material undergoing the hybrid orientation is not always capable of being produced easily and being used in practice. It will also be desired that the negative C-plate, which is described in Japanese Unexamined Patent Publication No. 2004-102200, and the O-plate, which is described in U.S. Pat. No. 5,638,197, be utilized in combination. However, currently, nothing has been reported with regard to information concerning a definite constitution for the combination of the C-plate and the O-plate and a practical effect of the combination of the C-plate and the O-plate, and a product utilizing the combination of the C-plate and the O-plate has not yet been produced.

As for the phase difference compensating device made from the inorganic material as disclosed in each of Japanese Unexamined Patent Publication No. 8(1996)-122523 and U.S. Pat. No. 5,932,354, nothing has heretofore been reported with regard to a practical effect obtained from the combination of the phase difference compensating device with the TN liquid crystal display device, and therefore it will not always be possible to utilize the phase difference compensating device for the phase difference compensation of the TN liquid crystal display device. Also, the technique for laminating the oblique incidence vacuum deposited film is disclosed in each of Japanese Unexamined Patent Publication No. 8(1996)-122523 and U.S. Pat. No. 5,932,354. However, with the disclosed technique for laminating the oblique incidence vacuum deposited film, the problems are encountered in that the surface characteristics of the phase difference compensating device become bad, and in that optical performance as designed is not capable of being obtained. Therefore, the disclosed technique for laminating the oblique incidence vacuum deposited film is not always practicable.

SUMMARY OF THE INVENTION

The primary object of the present invention is to provide a phase difference compensating device, which is capable of performing efficient phase difference compensating operation with respect to TN liquid crystal molecules having undergone hybrid orientation, and which is capable of being produced efficiently at a low production cost.

Another object of the present invention is to provide a phase difference compensating device, which has reliable optical performance and is provided with phase difference compensating layers capable of being produced with good reproducibility.

A further object of the present invention is to provide a liquid crystal apparatus, in which the phase difference compensating device is utilized efficiently.

The present invention provides a phase difference compensating device, which is adapted to be used in combination with a twisted nematic liquid crystal display device, and which is adapted to compensate for a phase difference occurring due to birefringence of a light beam passing through a liquid crystal layer of the twisted nematic liquid crystal display device, the phase difference compensating device comprising:

i) a first phase difference compensating layer, which is adapted to compensate for the phase difference occurring due to liquid crystal molecules having undergone normal orientation in the liquid crystal layer, ii) two second phase difference compensating layers, which are adapted to compensate for the phase difference occurring due to the liquid crystal molecules having undergone hybrid orientation in the liquid crystal layer, and iii) a transparent base plate, on which the first phase difference compensating layer and the two second phase difference compensating layers are supported, each of the two second phase difference compensating layers being constituted of one of two oblique incidence vacuum deposited films, each of which is formed on one of opposite surfaces of the base plate and with oblique incidence vacuum evaporation of an inorganic material, at least either one of an azimuthal angle of a direction of vacuum evaporation with respect to a plane of vacuum evaporation of the oblique incidence vacuum deposited film and a polar angle of the direction of vacuum evaporation with respect to the plane of vacuum evaporation of the oblique incidence vacuum deposited film being set to be different between the two second phase difference compensating layers having been formed on the opposite surfaces of the base plate.

The phase difference compensating device in accordance with the present invention should preferably be modified such that the first phase difference compensating layer is constituted of inorganic materials.

Also, the phase difference compensating device in accordance with the present invention should preferably be modified such that at least one transparent base plate, on which the first phase difference compensating layer and the second phase difference compensating layers have been supported, and at least one transparent base plate, on which at least the second phase difference compensating layers have been supported, are superposed one upon the other.

Further, the phase difference compensating device in accordance with the present invention should preferably be modified such that the azimuthal angle of the direction of vacuum evaporation with respect to the plane of vacuum evaporation of the oblique incidence vacuum deposited film, which constitutes one of the two second phase difference compensating layers, and the azimuthal angle of the direction of vacuum evaporation with respect to the plane of vacuum evaporation of the oblique incidence vacuum deposited film, which constitutes the other second phase difference compensating layer, are set to be different from an orientation azimuthal angle, which is imparted by orientating films of the twisted nematic liquid crystal display device to the liquid crystal molecules in the liquid crystal layer of the twisted nematic liquid crystal display device, and x and y coordinate components (Ax, Ay) of a composite vector, which has been composed from optic axis vectors defined with respect to the oblique incidence vacuum deposited films constituting the two second phase difference compensating layers, and which has been projected by orthographic projection onto the plane of vacuum evaporation, satisfy the conditions:

$$-100nm \leq Ax \leq 100nm$$

$$-200nm \leq Ay \leq -50nm$$

each of the optic axis vectors being defined with respect to each of the oblique incidence vacuum deposited films, which constitute the two second phase difference compensating layers, and in accordance with a value of a retardation obtained with the oblique incidence vacuum deposited film, the azimuthal angle having been set for the oblique incidence vacuum deposited film, and the polar angle having been set for the oblique incidence vacuum deposited film.

Furthermore, in cases where the x and y coordinate components (Ax, Ay) of the composite vector described above satisfy the conditions described above, the phase difference compensating device in accordance with the present invention should more preferably be modified such that a value of a retardation $d1\Delta n1$, which is obtained with the first phase difference compensating layer, satisfies the relationship:

$$-2 \times (d\Delta n)_{LC} \leq d1\Delta n1 \leq -0.5 \times (d\Delta n)_{LC}$$

with respect to the product $(d\Delta n)_{LC}$ of a thickness d of the liquid crystal layer of the twisted nematic liquid crystal display device and a birefringent index $\Delta n$ of the liquid crystal layer of the twisted nematic liquid crystal display device.

Also, the phase difference compensating device in accordance with the present invention should preferably be modified such that the first phase difference compensating layer is constituted of at least one vacuum deposited film of a high refractive index substance and at least one vacuum deposited film of a low refractive index substance, which vacuum deposited films are laminated alternately, and an optical film thickness of each of the vacuum deposited films falls within the range of one-hundredth of a reference light wavelength to one-fifth of the reference light wavelength.

Further, the phase difference compensating device in accordance with the present invention should preferably be modified such that an anti-reflection film is formed on at least either one of a light incidence side surface and a light radiating side surface of the phase difference compensating device.

The present invention also provides a liquid crystal apparatus, comprising:

a twisted nematic liquid crystal display device for displaying a projected image, and a phase difference compensating device in accordance with the present invention.

Examples of the liquid crystal apparatuses, in which the phase difference compensating device in accordance with the present invention is employed, include liquid crystal projectors and direct viewing types of flat panel display apparatuses. The liquid crystal projectors may be front projectors for projecting an image from a front surface side of a screen, or rear projectors for projecting an image from a rear surface side of the screen.

The liquid crystal apparatus in accordance with the present invention should preferably be modified such that the liquid crystal apparatus comprises:

three twisted nematic liquid crystal display devices, each of which displays a projected image with respect to one of three kinds of color component light beams, and three phase difference compensating devices, each of which is combined with one of the three twisted nematic liquid crystal display devices, the three phase difference compensating devices being constituted of at least two kinds of phase difference compensating devices, which vary in retardation in accordance with a reference wavelength of each of the color component light beams.

With the phase difference compensating device in accordance with the present invention, each of the two second phase difference compensating layers, which are adapted to compensate for the phase difference occurring due to the birefringence by the liquid crystal molecules having undergone the hybrid orientation in the liquid crystal layer, is constituted of one of the two oblique incidence vacuum deposited films, which are formed such that at least either one of the azimuthal angle of the direction of vacuum evaporation with respect to the plane of vacuum evaporation of the oblique incidence vacuum deposited film and the polar angle of the direction of vacuum evaporation with respect to the plane of vacuum evaporation of the oblique incidence vacuum deposited film is set to be different between the two second phase difference compensating layers having been formed on the opposite surfaces of the base plate. Therefore, good effects of phase difference compensation are capable of being obtained. Accordingly, for example, in cases where the phase difference compensating device in accordance with the present invention is utilized in combination with a TN liquid crystal display device operating in the normally white mode, the occurrence of light leakage during the dark state displaying is capable of being suppressed with respect to the oblique incident light. As a result, the contrast of the displayed image is capable of being kept high.

Also, with the phase difference compensating device in accordance with the present invention, the second phase difference compensating layers, each of which is constituted of the inorganic material, have a high heat resistance and a highlight resistance. Further, the second phase difference compensating layers have a high physical stability and a high chemical stability. Therefore, the phase difference compensating device in accordance with the present invention has the advantages in that the phase difference compensating device is capable of being applied to the liquid crystal projectors, in which a high luminance light source is utilized. Furthermore, with the phase difference compensating device in accordance with the present invention, the first phase difference compensating layer is capable of being constituted of the vacuum deposited films of the inorganic materials. Therefore, the first phase difference compensating layer and the second phase difference compensating layers are capable of being formed efficiently with serial processes.

Further, with the phase difference compensating device in accordance with the present invention, each of the two second phase difference compensating layers is constituted of one of the two oblique incidence vacuum deposited films, each of which is formed on one of the opposite surfaces of the base plate. Therefore, the problems, which are apt to occur in cases where a plurality of oblique incidence vacuum deposited films are laminated together on one surface of the base plate, are capable of being eliminated. Specifically, it is possible to prevent the problems from occurring in that, in cases where an oblique incidence vacuum deposited film is overlaid upon an underlying oblique incidence vacuum deposited film, which varies in azimuthal angle or a polar angle of the direction of vacuum evaporation from the overlaid oblique incidence vacuum deposited film, an uneven surface state of the underlying oblique incidence vacuum deposited film is reflected upon the overlaid oblique incidence vacuum deposited film, cloudiness thus occurs with the film, and the optical performance becomes bad. Also, it is possible to prevent the problems from occurring in that, though the cloudiness does not occur with the film, the reproducibility of the phase difference compensating layers is not capable of being kept high.

BRIEF DESCRIPTION OF THE DRAWINGS

FIG. 10 is a table showing dependence of a retardation, which is obtained with a TN liquid crystal display device, upon light wavelengths, FIG. 11 is a table showing dependence of a retardation, which is obtained with a first phase difference compensating layer, upon light wavelengths, FIG. 12 is a graph showing retardation characteristics of the TN liquid crystal display device and the first phase difference compensating layer, FIG. 13 is a table showing dependence of a retardation, which is obtained with an improved first phase difference compensating layer, upon light wavelengths.

DESCRIPTION OF THE PREFERRED EMBODIMENTS

The present invention will hereinbelow be described in further detail with reference to the accompanying drawings.

First Embodiment

Figure 1:
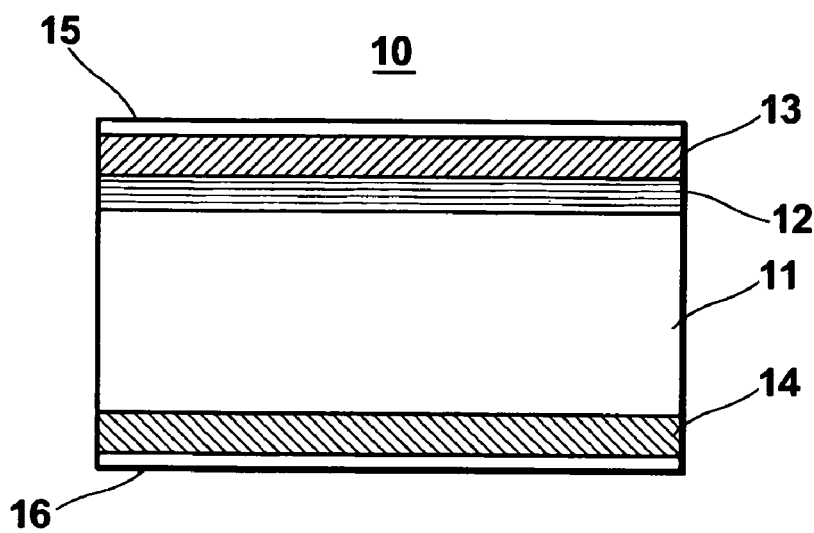
FIG. 1 is a schematic sectional side view showing a first embodiment of the phase difference compensating device in accordance with the present invention.
Figure 2:
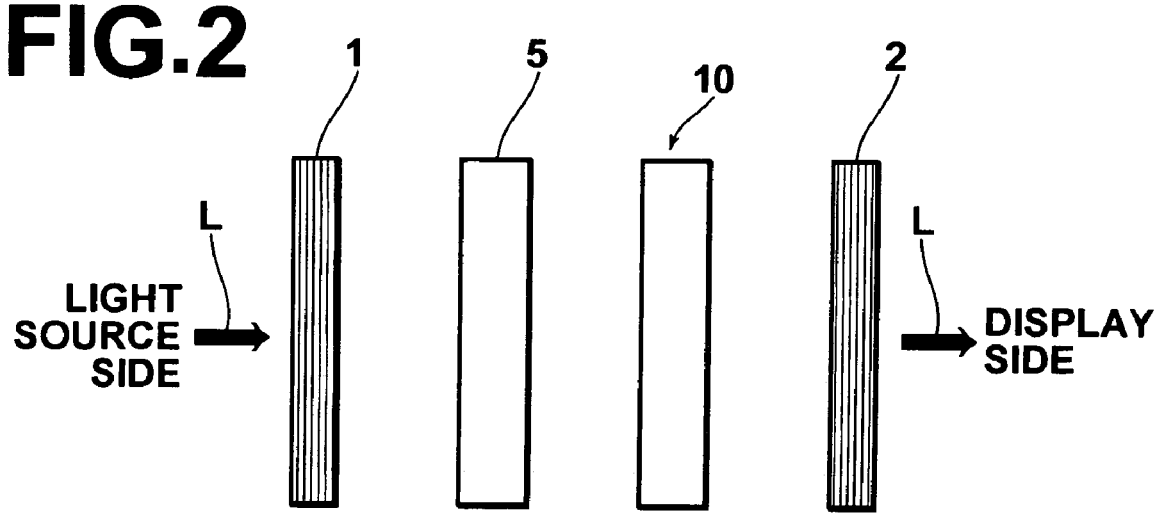
FIG. 2 is a schematic view showing an example of a displaying system, in which the first embodiment of the phase difference compensating device in accordance with the present invention is employed.

FIG. 1 is a schematic sectional side view showing a phase difference compensating device 10, which is a first embodiment of the phase difference compensating device in accordance with the present invention. FIG. 2 is a schematic view showing an example of a displaying system, in which the phase difference compensating device 10 in accordance with the present invention is employed. Firstly, the phase difference compensating device 10 will be described hereinbelow with reference to FIG. 1. As illustrated in FIG. 1, the phase difference compensating device 10 comprises a transparent base plate 11, which may be made from glass, or the like. The phase difference compensating device 10 also comprises a first phase difference compensating layer 12, which is formed on one surface of the transparent base plate 11 (i.e., the top surface of the transparent base plate 11 in FIG. 1). The phase difference compensating device 10 further comprises a second phase difference compensating layer 13, which is formed on the first phase difference compensating layer 12. The phase difference compensating device 10 still further comprises a second phase difference compensating layer 14, which is formed on the opposite surface of the transparent base plate 11 (i.e., the bottom surface of the transparent base plate 11 in FIG. 1). The phase difference compensating device 10 also comprises an anti-reflection layer 15, which is formed on the second phase difference compensating layer 13. The phase difference compensating device 10 further comprises an anti-reflection layer 16, which is formed on the bottom surface of the second phase difference compensating layer 14.

Basically, the phase difference compensating device 10 may be utilized in the displaying system illustrated in FIG. 2. The displaying system illustrated in FIG. 2 comprises a transmission type of a TN liquid crystal display device 5, which is located at a position for exposure to a light beam L. By way of example, the light beam L acts as projected light in a liquid crystal projector. The displaying system also comprises a polarizing plate 1, which is located on the light incidence surface side of the TN liquid crystal display device 5. The displaying system further comprises a polarizing plate 2, which is located on the light radiating surface side of the TN liquid crystal display device 5. The phase difference compensating device 10 is located between the TN liquid crystal display device 5 and the polarizing plate 2. In this example, such that the displaying system may be utilized in the normally white mode, the polarizing plate 1 and the polarizing plate 2 are set in the crossed Nicols arrangement, in which the directions of polarization are normal to each other. The polarizing plate 1 acts as a polarizer for converting the incident light into linearly polarized light. The polarizing plate 2 acts as an analyzer for radiating out only the light component of the light having been modulated by the TN liquid crystal display device 5 and having been radiated out from the TN liquid crystal display device 5, which light component has the direction of polarization coinciding with the direction of polarization with the polarizing plate 2. The analyzer blocks the remaining light component of the light having been modulated by the TN liquid crystal display device 5 and having been radiated out from the TN liquid crystal display device 5.

The liquid crystal molecules contained in the liquid crystal layer of the TN liquid crystal display device 5 has the birefringent effect. The liquid crystal molecules convert the linearly polarized light into various elliptically polarized light beams in accordance with the orientated attitudes of the liquid crystal molecules and the angle of incidence of the incident light and radiate out the elliptically polarized light beams. Therefore, it often occurs that apart of the light to be blocked by the polarizing plate 2 is contained in the light for the image formation. The phase difference compensating device 10 has the effect of compensating for a phase difference between ordinary rays and extraordinary rays, which occur due to the birefringent effect of the liquid crystal molecules contained in the liquid crystal layer of the TN liquid crystal display device 5, and restoring the elliptically polarized light beams to the original linearly polarized light. In the phase difference compensating device 10 illustrated in FIG. 1, the first phase difference compensating layer 12, and the like, are supported on the transparent base plate 11. Alternatively, instead of the transparent base plate 11 being utilized, the TN liquid crystal display device 5 or a transparent base plate of the polarizing plate 2 may be utilized for supporting the first phase difference compensating layer 12, and the like.

Reverting to FIG. 1, the constitution of the phase difference compensating device 10 will be described hereinbelow.

(Formation of the First Phase Difference Compensating Layer 12)

The first phase difference compensating layer 12 is constituted of a multi-layer film comprising two kinds of vacuum deposited films, which have different refractive indexes and are overlaid alternately on the transparent base plate 11. The direction of vacuum evaporation of one of the two kinds of the vacuum deposited films and the direction of vacuum evaporation of the other kind of the vacuum deposited film are normal to the plane of vacuum evaporation, i.e. the surface of the transparent base plate 11. The optical film thickness (i.e., the product of the physical film thickness and the refractive index) of each of the two kinds of the vacuum deposited films should preferably be sufficiently smaller than a reference light wavelength $\lambda$ (e.g., 450 nm). Specifically, the optical film thickness of each of the two kinds of the vacuum deposited films should preferably fall within the range of $\lambda/100$ to $\lambda/5$, and should more preferably fall within the range of $\lambda/50$ to $\lambda/5$. From the practical point of view, the optical film thickness of each of the two kinds of the vacuum deposited films should most preferably fall within the range of approximately $\lambda/30$ to approximately $\lambda/10$. The optical film thickness of each of the two kinds of the vacuum deposited films is thus sufficiently smaller than the optical film thickness of an ordinary optical thin film utilizing light interference. The thus formed multi-layer film has the negative C-plate characteristics and is utilized as a negative uniaxial birefringent material.

The first phase difference compensating layer 12 is designed in the manner described below. Specifically, as described in "Kogaku" (Optics), Vol. 27, No. 1, pp. 12-17, 1998, a birefringent index $\Delta n1$ of the first phase difference compensating layer 12 is determined by the ratio between the optical film thicknesses of the two kinds of the vacuum deposited films having different refractive indexes. As the difference between the refractive indexes of the two kinds of the vacuum deposited films becomes large, the birefringent index $\Delta n1$ of the first phase difference compensating layer 12 takes a large value. Also, a phase difference (i.e., a retardation) obtained with the first phase difference compensating layer 12 may be represented by a product $d1\Delta n1$ of the birefringent index $\Delta n1$ of the first phase difference compensating layer 12 and a physical total film thickness $d1$ of the first phase difference compensating layer 12. Therefore, in order for a desired retardation to be obtained with the first phase difference compensating layer 12, a film thickness ratio may be calculated such that the value of the birefringent index $\Delta n1$ obtained from the materials may become large, and the total film thickness $d1$ of the entire first phase difference compensating layer 12 may be determined in accordance with the birefringent index $\Delta n1$.

As described above, the negative phase difference obtained with the birefringent effect of the first phase difference compensating layer 12 is given by the product of the total film thickness $d1$ of the first phase difference compensating layer 12 and the birefringent index $\Delta n1$ of the first phase difference compensating layer 12. In this embodiment, by way of example, the first phase difference compensating layer 12 is constituted in the manner described below. Specifically, as the transparent base plate 11, a transparent base plate, which has a size of 50 mm×50 mm and is constituted of a glass material (1737 Glass, supplied by Corning Glass Works), is employed. Also, 50 $TiO_2$ layers, each of which has a physical film thickness of 30 nm, and 50 $SiO_2$ layers, each of which has a physical film thickness of 20 nm, are alternately overlaid one upon another on the transparent base plate 11, such that the total thickness may become equal to 5 µm. The first phase difference compensating layer 12 is thus constituted of the 100 layers. With measurements made by use of a spectro ellipsometer, it has been confirmed that the first phase difference compensating layer 12 having thus been obtained is a negative birefringent material, that the optic axis, which does not cause optical anisotropy to occur, coincides with the normal line with respect to the transparent base plate 11, and that the first phase difference compensating layer 12 having thus been obtained acts as the negative C-plate. Also, it has been found that the retardation $d1\Delta n1$ obtained with the first phase difference compensating layer 12 with respect to a wavelength of 450 nm is −600 nm.

As the deposition materials for the aforesaid two kinds of the vacuum deposited films, the materials described below may be utilized. Specifically, as the high refractive index material, $TiO_2$ (n=2.2 to 2.4), $ZrO_2$ (n=2.20), or the like, may be utilized. Also, as the low refractive index material, $SiO_2$ (n=1.40 to 1.48), $MgF_2$ (n=1.39), $CaF_2$ (n=1.30), or the like, may be utilized. Further, as the deposition materials, it is possible to utilize the following various materials (values in parentheses: approximate values of refractive indexes): $CeO_2$ (2.45), $SnO_2$ (2.30), $Ta_2O_5$ (2.12), $In_2O_3$ (2.00), $ZrTiO_4$ (2.01), $HfO_2$ (1.91), $Al_2O_3$ (1.59 to 1.70), $MgO$ (1.7), $AlF_3$, diamond thin film, $LaTiO_x$, and samarium oxide. The combination of the material for the high refractive index thin film layer and the material for the low refractive index thin film layer should preferably be $TiO_2/SiO_2$. As the combination of the material for the high refractive index thin film layer and the material for the low refractive index thin film layer, it is also possible to utilize $Ta_2O_5/Al_2O_3$, $HfO_2/SiO_2$, $MgO/MgF_2$, $ZrTiO_4/Al_2O_3$, $CeO_2/CaF_2$, $ZrO_2/SiO_2$, or $ZrO_2/Al_2O_3$.

In order for the two kinds of the vacuum deposited films having the different indexes to be formed alternately for the formation of the first phase difference compensating layer 12, it is possible to employ the technique, wherein a shutter is located for blocking each of hearths, each of which contains one of the deposition materials, with respect to the transparent base plate 11 and is opened and closed alternately for allowing the two kinds of the vacuum deposited films to be formed alternately. It is also possible to employ the technique, wherein the transparent base plate 11 is supported on a base plate holder capable of being circulated at a predetermined speed, wherein the transparent base plate 11 having been supported on the base plate holder is passed over each of the hearths during the circulation, and wherein the two kinds of the vacuum deposited films are thus alternately overlaid on the transparent base plate 11. In such cases, a vacuum tank utilized for the vacuum evaporation may be evacuated into a vacuum only one time for the formation of the multi-layer thin film, and therefore the multi-layer thin film is capable of being produced efficiently.

(Formation of the Second Phase Difference Compensating Layers 13 and 14)

Each of the second phase difference compensating layer 13 and the second phase difference compensating layer 14 of the phase difference compensating device 10 illustrated in FIG. 1 is formed in the manner different from that for the vacuum deposited film constituting the first phase difference compensating layer 12. Specifically, each of the second phase difference compensating layer 13 and the second phase difference compensating layer 14 is formed with an oblique incidence vacuum evaporation technique, in which a deposition material is deposited obliquely with respect to the plane of vacuum evaporation (i.e., the surface of the first phase difference compensating layer 12 or the surface of the transparent base plate 11). Each of the second phase difference compensating layer 13 and the second phase difference compensating layer 14 has a structure of an aggregate of fine pillar-shaped elements, which have grown obliquely along the direction of vacuum evaporation. Also, the pillar-shaped elements constituting the second phase difference compensating layer 13 are nonparallel with the pillar-shaped elements constituting the second phase difference compensating layer 14. A single layer of the oblique incidence vacuum deposited film of the type described above has a structural birefringent effect and is capable of being utilized as the O-plate having a positive birefringent index. However, this embodiment is characterized by the utilization of the two oblique incidence vacuum deposited films.

In this embodiment, the second phase difference compensating layer 13 is overlaid on the first phase difference compensating layer 12, which has been overlaid on the transparent base plate 11. Alternatively, the second phase difference compensating layer 13 may be formed on the transparent base plate 11, and the first phase difference compensating layer 12 may be overlaid on the second phase difference compensating layer 13.

Figure 3:
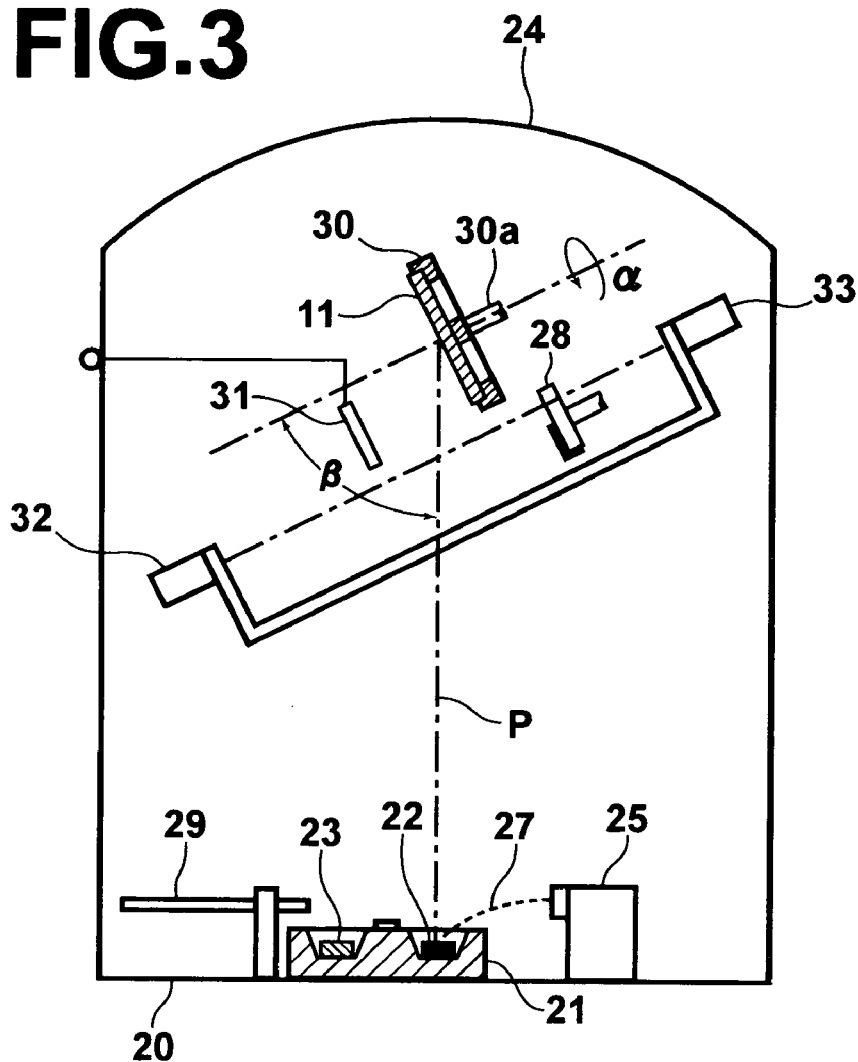
FIG. 3 is a schematic view showing an example of a vacuum evaporation apparatus, which may be used for the formation of an oblique incidence vacuum deposited film.

By way of example, each of the oblique incidence vacuum deposited films constituting the second phase difference compensating layer 13 and the second phase difference compensating layer 14 may be formed by use of a vacuum evaporation apparatus illustrated in FIG. 3. In the vacuum evaporation apparatus illustrated in FIG. 3, a material holder 21 capable of being rotated as in the cases of a turret is located on an apparatus base plate 20, which acts as a bottom plate of a vacuum tank 24. Also, a deposition material 22 and a deposition material 23 are accommodated in the material holder 21. Further, after the vacuum tank 24 has been evacuated into a vacuum, an electron beam 27 is produced by an electron gun 25 and is irradiated to the deposition material 22. The deposition material 22 is thus vaporized for the formation of the vacuum deposited film.

The starting and the ceasing of the vacuum evaporation are capable of being controlled by the opening and the closing of a shutter 29. Also, the deposition material 22 or the deposition material 23 is capable of being utilized selectively by the rotation of the material holder 21. Basically, the second phase difference compensating layer 13 is formed by use of one kind of the deposition material. In cases where the material holder 21 is utilized, when necessary, it becomes possible to utilize a different kind of a deposition material.

Also, a base plate holder 30 is obliquely located above the material holder 21. The transparent base plate 11, on which the first phase difference compensating layer 12 has been formed, is supported by the base plate holder 30. The line normal to the support surface of the base plate holder 30 is tilted by an angle β with respect to a line segment P, which extends from the deposition material 22 in the direction normal to the deposition material 22. Therefore, the plane of vacuum evaporation on the transparent base plate 11 is also tilted by the angle β with respect to the line segment P. The angle β is capable of being adjusted with a rotation of the base plate holder 30 around an axis, which is normal to the plane of the sheet of FIG. 3. Also, with the rotation of the base plate holder 30 around a shaft 30a, an angle α, which corresponds to the azimuthal angle of the line segment P in the plane of vacuum evaporation, is capable of being adjusted.

The line segment P described above corresponds to the direction of vacuum evaporation with respect to the plane of vacuum evaporation. Therefore, with alterations of the angle α and the angle β, the direction of vacuum evaporation with respect to the plane of vacuum evaporation is capable of being adjusted in two ways. The angle α corresponds to the azimuthal angle of the direction of vacuum evaporation in the plane of vacuum evaporation. Also, the angle β corresponds to a polar angle, which represents the tilt of the direction of vacuum evaporation with respect to the plane of vacuum evaporation. Therefore, the angle α will hereinbelow be referred to as the azimuthal angle α of the direction of vacuum evaporation. Also, the angle β will hereinbelow be referred to as the polar angle β of the direction of vacuum evaporation.

Figure 4:
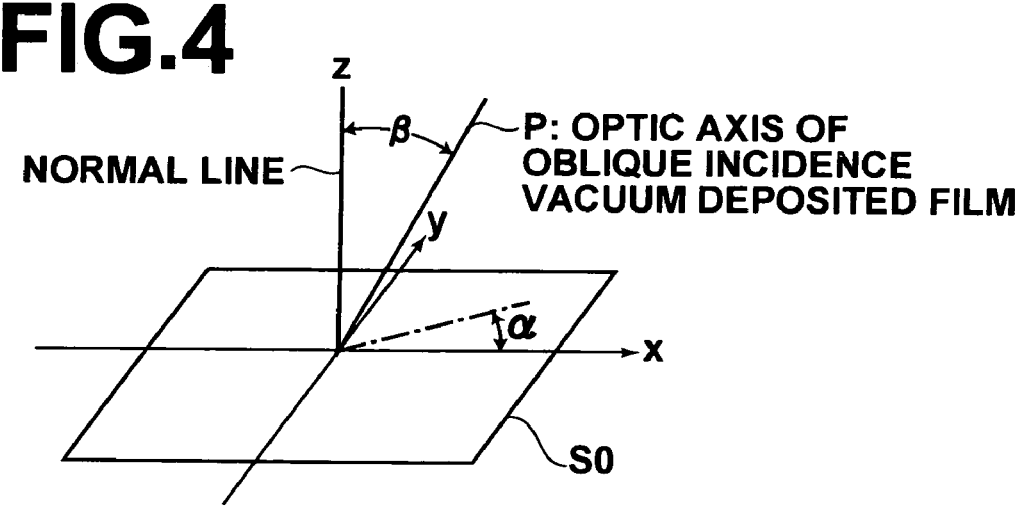
FIG. 4 is an explanatory view showing an azimuthal angle of a direction of vacuum evaporation with respect to a plane of vacuum evaporation of an oblique incidence vacuum deposited film and a polar angle of the direction of vacuum evaporation with respect to the plane of vacuum evaporation of the oblique incidence vacuum deposited film.

FIG. 4 is an explanatory view showing the azimuthal angle α and the polar angle β. As illustrated in FIG. 4, in cases where the direction of vacuum evaporation P with respect to a plane of vacuum evaporation S0 is projected by orthographic projection onto an x-y coordinate plane on the plane of vacuum evaporation S0, the direction of vacuum evaporation P with respect to the plane of vacuum evaporation S0 is capable of being represented by the azimuthal angle α, which is measured in a counter-clockwise direction from the x axis, and the polar angle β, which is measured from a z axis. The polar angle β representing the tilt from the z axis is the angle, which does not have the positive or negative directivity. The azimuthal angle α has the directivity with respect to the x axis. As an aid in facilitating the explanation, the direction of the x axis is set so as to coincide with the direction of orientation, which is imparted to the liquid crystal molecules by the orientating film of the TN liquid crystal display device.

Reverting to FIG. 3, a reference numeral 31 represents a rock crystal type of a film thickness monitor. The film thickness monitor 31 monitors the film thickness of the vacuum deposited film on a measurement surface and relatively measures the extent of progress of the vacuum evaporation on the transparent base plate 11 having been supported by the base plate holder 30. Also, a reference numeral 32 represents an ellipsometer. The ellipsometer 32 receives measurement light coming through a monitor base plate 28 from a light projector 33. The ellipsometer 32 is capable of relatively measuring the birefringent index Δn, while the oblique incidence vacuum deposited film is being formed on the transparent base plate 11. The measurement surface of the film thickness monitor 31 and the system for measuring the birefringent index Δn, which system contains the monitor base plate 28, are capable of being rotated so as to coincide with the polar angle β of the base plate holder 30.

After the formation of one layer of the oblique incidence vacuum deposited film is finished, the position of a masking plate (not shown) is altered, and a new measurement surface and a new monitor base plate surface are exposed. In this manner, the film thickness and the birefringent index are capable of being monitored with respect to each layer. The retardation obtained with the oblique incidence vacuum deposited film may be represented by the product of the birefringent index Δn and the film thickness. Therefore, in cases where the vacuum evaporation is performed, while measurement data obtained from the ellipsometer 32 and the film thickness monitor 31 are being monitored, the oblique incidence vacuum deposited film imparting a desired retardation is capable of being obtained from the vacuum evaporation of each layer.

With the processing described above, the second phase difference compensating layer 13 constituted of the oblique incidence vacuum deposited film is capable of being formed on the first phase difference compensating layer 12. In this embodiment, as the deposition material, a mixture of $ZrO_2$ and 10% by weight of $TiO_2$ is utilized. Also, the region within the vacuum tank 24 is evacuated to a vacuum of $1\times10^{-4}$ Pa, and an oxygen gas is then introduced into the vacuum tank 24 until the region within the vacuum tank 24 is set at a pressure of $1\times10^{-2}$ Pa. In this state, the film formation is performed under the conditions of a setting angle of the transparent base plate 11 of 80° and an azimuthal angle of −137° and until a retardation dΔn becomes equal to 150 nm. In such cases, the optic axis direction of the oblique incidence vacuum deposited film having been obtained is such that the polar angle β is equal to 45°.

After the second phase difference compensating layer 13 has been formed in the manner described above, the transparent base plate 11 is removed from the base plate holder 30, turned over, and again set on the base plate holder 30. Also, the processing is performed in the same manner as that described above, and the second phase difference compensating layer 14 is formed on the surface of the transparent base plate 11, which surface is opposite to the side having been subjected to the formation of the second phase difference compensating layer 13. For the formation of the second phase difference compensating layer 14, the same deposition material as that for the formation of the second phase difference compensating layer 13 is utilized. Also, the second phase difference compensating layer 14 is obtained from the film formation performed under the conditions of a setting angle of the transparent base plate 11 of 65° and an azimuthal angle of −45° and until a retardation dΔn becomes equal to 180 nm. In such cases, the optic axis direction of the oblique incidence vacuum deposited film having been obtained is such that the polar angle β is equal to 33°.

As in the cases of the first phase difference compensating layer 12, the deposition material for the formation of the second phase difference compensating layer 13 and the second phase difference compensating layer 14 is not limited to the deposition material utilized in the embodiment described above. The deposition material for the formation of the second phase difference compensating layer 13 and the second phase difference compensating layer 14 may be selected from various materials capable of yielding the oblique incidence vacuum deposited film, which has sufficient light transmission characteristics regardless of light wavelengths. For example, the deposition material for the formation of the second phase difference compensating layer 13 and the second phase difference compensating layer 14 may be selected from $TiO_2$, $SiO_2$, $ZrO_2$, and $Ta_2O_3$.

(Formation of the Anti-Reflection Layers 15 and 16)

Each of the anti-reflection layer 15 and the anti-reflection layer 16 prevents surface reflection from occurring. By way of example, each of the anti-reflection layer 15 and the anti-reflection layer 16 may be constituted of a single-layer film of $MgF_2$ acting as a low refractive index material, which film is formed such that the optical film thickness is equal to λ/4. Alternatively, each of the anti-reflection layer 15 and the anti-reflection layer 16 may be constituted of a multi-layer anti-reflection film formed from different kinds of deposition materials. In this embodiment, in order for the anti-reflection layer 15 to be formed, the region within the vacuum tank 24 illustrated in FIG. 3 is evacuated to a vacuum of $1\times10^{-4}$ Pa, and the transparent base plate 11, on which the first phase difference compensating layer 12, the second phase difference compensating layers 13, and the second phase difference compensating layer 14 have been formed, is set on the base plate holder 30. In this state, the anti-reflection layer 15 is formed on the second phase difference compensating layer 13 with a front surface vacuum evaporation technique. In such cases, a layer of $SiO_2$, a layer of $TiO_2$, and a layer of $SiO_2$ are vacuum deposited in this order, such that the optical thin film thicknesses of the layer of $SiO_2$, the layer of $TiO_2$, and the layer of $SiO_2$ may be equal to λ/4, λ/2, and λ/4, respectively, with respect to the reference wavelength λ. The anti-reflection layer 15 having the three-layer structure is thus formed. In this case, the reference wavelength λ is set to be 420 nm.

Thereafter, the transparent base plate 11 is turned over and set on the base plate holder 30, and the processing is performed in the same manner as that described above. The anti-reflection layer 16 having the same structure as that of the anti-reflection layer 15 is formed on the second phase difference compensating layer 14. Besides the vacuum evaporation technique utilizing resistance heating or electron beam heating, a sputtering film formation technique, or the like, may be employed for the formation of the anti-reflection layer 15, the anti-reflection layer 16, the first phase difference compensating layer 12, the second phase difference compensating layer 13, and the second phase difference compensating layer 14.

In the manner described above, this embodiment of the phase difference compensating device 10 is obtained. Table 1 shown below lists optical constants of the phase difference compensating device 10.

TABLE 1

| First embodiment | Azimuthal angle α(°) | Polar angle β(°) | (dΔn) (nm) |
|---|---|---|---|
| Second phase difference compensating layer 14 | −45 | 33 | 180 |
| Second phase difference compensating layer 13 | −137 | 45 | 150 |
| First phase difference compensating layer 12 | — | — | −600 |
| Transparent base plate 11 | — | — | — |

As clear from Table 1, this embodiment of the phase difference compensating device 10 has the characteristics such that both the azimuthal angle α and the polar angle β are set to be different between the second phase difference compensating layer 13 and the second phase difference compensating layer 14. The phase difference compensating device 10 is free from cloudiness, and the like, and has good surface characteristics. Also, with evaluation of scattering characteristics of the phase difference compensating device 10 in terms of haze as defined by JIS K7136, it has been confirmed that the haze is as small as 0.8%, and that the surface characteristics are good.

Further, in cases where the displaying system illustrated in FIG. 2 is constituted by use of the phase difference compensating device 10, and the field of view is thus evaluated, it has been found that the angle range, in which a contrast ratio of at least 500:1 is obtained, is ±7° in the vertical direction and ±18° in the horizontal direction. In cases where the phase difference compensating device 10 is removed from the displaying system illustrated in FIG. 2, the angle range, in which a contrast ratio of at least 500:1 is obtained, is ±5° in the vertical direction and ±30° in the horizontal direction. Ordinarily, in the cases of the liquid crystal projectors, it is desired that the angle range, in which a contrast ratio of at least 500:1 is obtained, be ±15° in each of the vertical direction and the horizontal direction. As described above, with this embodiment of the phase difference compensating device 10, the angle range, in which a contrast ratio of at least 500:1 is obtained, is wider than ±15° in the horizontal direction and is improved from ±5° to ±7° in the vertical direction. The phase difference compensating device 10 is thus capable of sufficiently operating as the phase difference compensating device.

COMPARATIVE EXAMPLE

In the aforesaid first embodiment of the phase difference compensating device 10, the second phase difference compensating layer 14 is formed on the surface of the transparent base plate 11, which surface is opposite to the base plate surface side subjected to the formation of the second phase difference compensating layer 13. In the comparative example, a phase difference compensating device was prepared in the same manner as that for the aforesaid first embodiment of the phase difference compensating device 10, except for the constitution described below. Specifically, in the comparative example, the second phase difference compensating layer 14 was formed on the second phase difference compensating layer 13, and the anti-reflection layer 15 was then formed on the second phase difference compensating layer 14. Also, the anti-reflection layer 16 was formed on the surface of the transparent base plate 11, which surface was opposite to the base plate surface side subjected to the formation of the second phase difference compensating layer 13 and the second phase difference compensating layer 14.

As for the phase difference compensating device prepared in the comparative example, the scattering characteristics were evaluated in terms of the haze described above. It was found that the haze was 9%. Also, the second phase difference compensating layer 14 having been formed on the second phase difference compensating layer 13 had comparatively large protrusions and recesses, which did not occur with the phase difference compensating device 10. Further, the phase difference compensating device prepared in the comparative example had optical characteristics worse than the optical characteristics of the aforesaid first embodiment of the phase difference compensating device 10 and was thus inappropriate for use as the phase difference compensating device for projectors.

Second Embodiment

Figure 5:
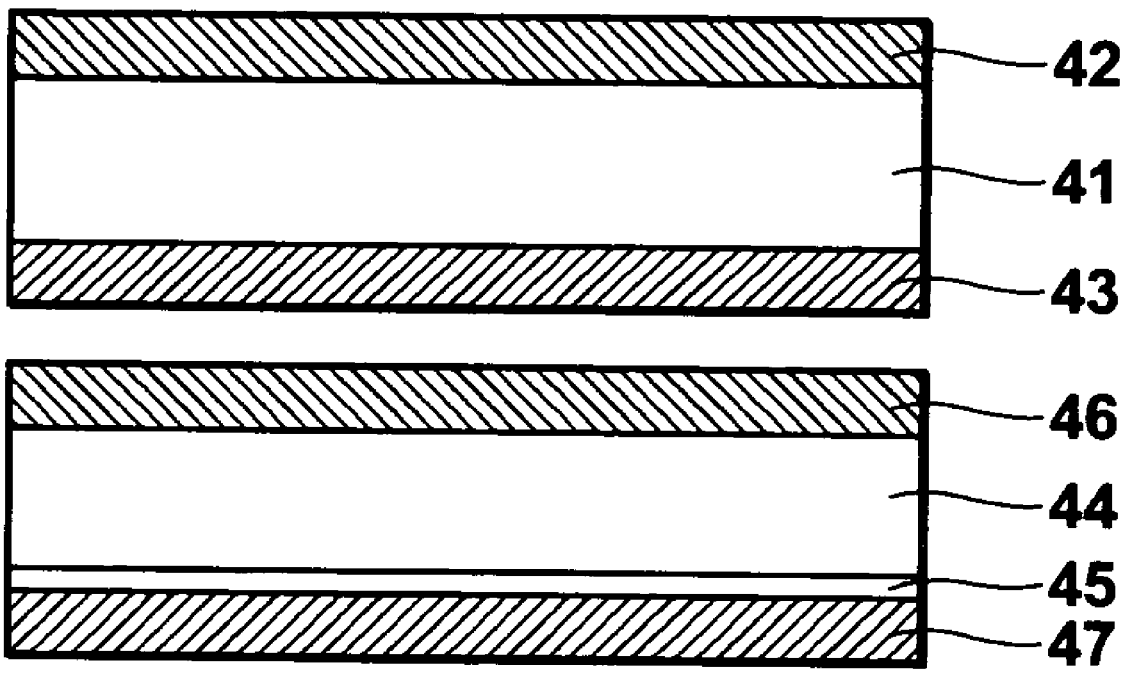
FIG. 5 is a schematic sectional side view showing a second embodiment of the phase difference compensating device in accordance with the present invention.

A second embodiment of the phase difference compensating device in accordance with the present invention will be described hereinbelow with reference to FIG. 5. FIG. 5 is a schematic sectional side view showing a phase difference compensating device 40, which is a second embodiment of the phase difference compensating device in accordance with the present invention. As illustrated in FIG. 5, the phase difference compensating device 40 comprises a transparent base plate 41, which is provided with phase difference compensating layers formed on opposite surfaces, and a transparent base plate 44, which is provided with phase difference compensating layers formed on opposite surfaces. Specifically, a second phase difference compensating layer 42 is formed on one of the opposite surfaces of the transparent base plate 41, and a second phase difference compensating layer 43 is formed on the other surface of the transparent base plate 41. Also, a second phase difference compensating layer 46 is formed on one of the opposite surfaces of the transparent base plate 44, a first phase difference compensating layer 45 is formed on the other surface of the transparent base plate 44, and a second phase difference compensating layer 47 is formed on the first phase difference compensating layer 45.

The first phase difference compensating layer 45 is formed in the same manner as that for the first phase difference compensating layer 12 in the aforesaid first embodiment of the phase difference compensating device 10. Also, the second phase difference compensating layers 42, 43, 46, and 47 are formed in the same manner as that for the second phase difference compensating layers 13 and 14 in the aforesaid first embodiment of the phase difference compensating device 10. Though not shown in FIG. 5, an anti-reflection layer should preferably be formed on each of the second phase difference compensating layers 42, 43, 46, and 47 in the same manner as that for the anti-reflection layers 15 and 16 in the aforesaid first embodiment of the phase difference compensating device 10.

Table 2 shown below lists the optical constants of the second embodiment of the phase difference compensating device 40.

TABLE 2

| Second embodiment | Azimuthal angle $\alpha(°)$ | Polar angle $\beta(°)$ | $(d\Delta n)$ (nm) |
|---|---|---|---|
| Second phase difference compensating layer 47 | −138 | 40 | 104 |
| Second phase difference compensating layer 46 | −116 | 24 | 214 |
| Second phase difference compensating layer 43 | −16 | 24 | 72 |
| Second phase difference compensating layer 42 | 22 | 24 | 104 |
| First phase difference compensating layer 45 | — | — | −500 |
| Transparent base plates 41 and 44 | — | — | — |

As clear from Table 2, this embodiment of the phase difference compensating device 40 has the characteristics such that the azimuthal angle $\alpha$ is set to be different between the second phase difference compensating layer 42 and the second phase difference compensating layer 43, which are formed on the transparent base plate 41. Also, on the side of the transparent base plate 44, both the azimuthal angle $\alpha$ and the polar angle $\beta$ are set to be different between the second phase difference compensating layer 46 and the second phase difference compensating layer 47. The phase difference compensating device 40 is free from cloudiness, and the like, and has good surface characteristics. Also, with the evaluation of the scattering characteristics of the phase difference compensating device 40 in terms of the haze described above, it has been confirmed that the haze is as small as at most 1%, and that the surface characteristics are good.

Further, in cases where the displaying system illustrated in FIG. 2 is constituted by use of the phase difference compensating device 40 in lieu of the phase difference compensating device 10, and the field of view is thus evaluated, it has been found that the angle range, in which a contrast ratio of at least 500:1 is obtained, is ±26° in the vertical direction and ±30° in the horizontal direction. Ordinarily, in the cases of the liquid crystal projectors, it is desired that the angle range, in which a contrast ratio of at least 500:1 is obtained, be ±15° in each of the vertical direction and the horizontal direction. As described above, this embodiment of the phase difference compensating device 40 sufficiently satisfies the requirement described above.

<Optical Characteristics>

Figure 6:
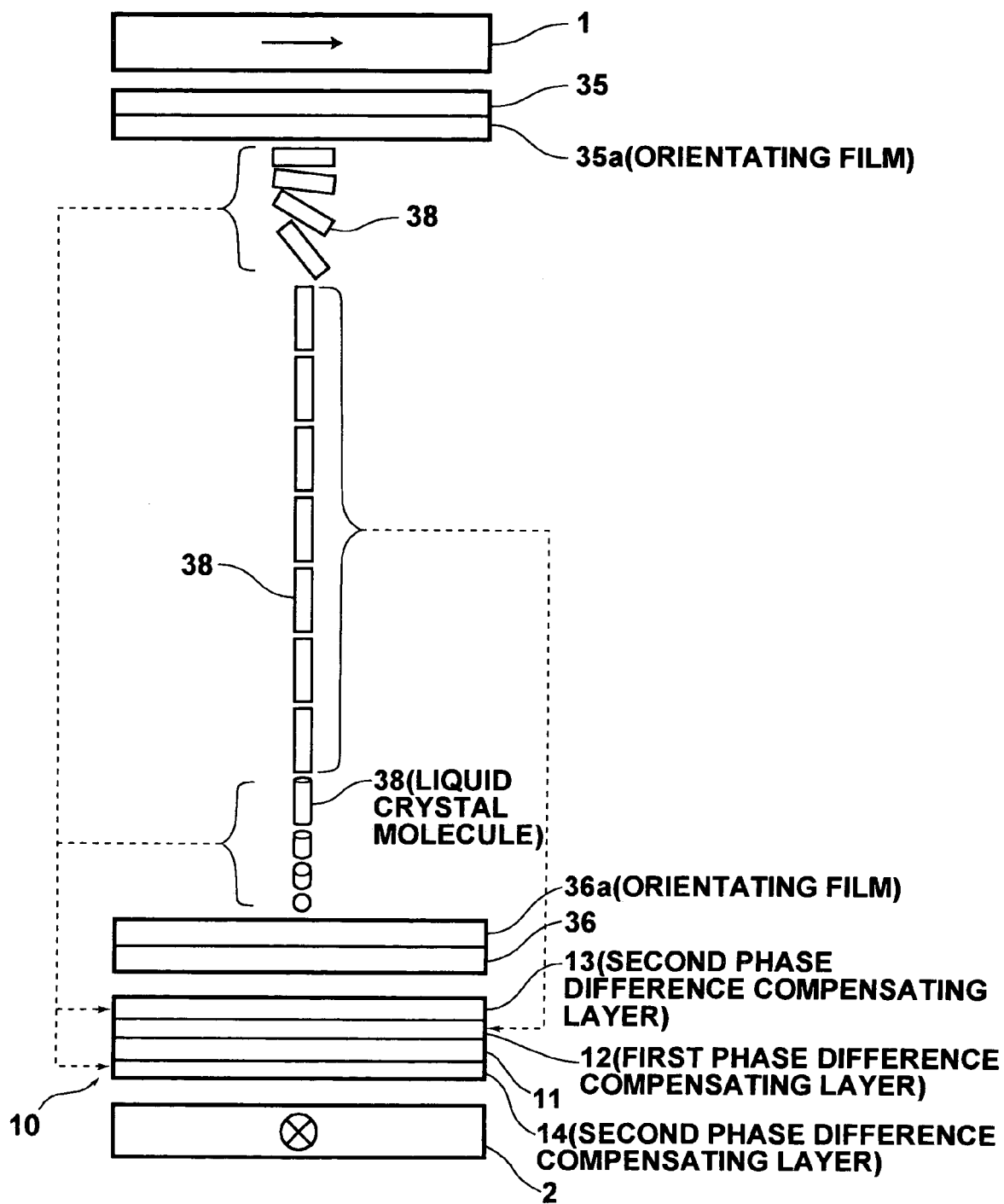
FIG. 6 is an explanatory view showing effects of the first embodiment of the phase difference compensating device in accordance with the present invention.

The optical characteristics of the phase difference compensating device in accordance with the present invention will hereinbelow be described in more detail with the first embodiment of the phase difference compensating device 10 being taken as an example. FIG. 6 schematically shows a state, in which a saturation voltage is applied for the dark state displaying across base plates 35 and 36 of the TN liquid crystal display device 5 in the displaying system illustrated in FIG. 2. As illustrated in FIG. 6, an orientating film 35a is located on the side inward from the base plate 35 of the TN liquid crystal display device 5. Also, an orientating film 36a is located on the side inward from the base plate 36 of the TN liquid crystal display device 5. The orientating film 35a and the orientating film 36a act to impart a 90° twisted orientation to liquid crystal molecules 38, 38, . . . contained in the liquid crystal layer of the TN liquid crystal display device 5. The orientating film 35a imparts the orientation in the direction, which is parallel with the plane of the sheet of FIG. 6, to the liquid crystal molecules 38, 38, . . . . The orientating film 36a imparts the orientation in the direction, which is normal to the plane of the sheet of FIG. 6, to the liquid crystal molecules 38, 38, . . . . The direction of polarization with the polarizing plate 1 is set so as to coincide with the direction of orientation imparted by the orientating film 35a. Also, the direction of polarization with the polarizing plate 2 is set so as to coincide with the direction of orientation imparted by the orientating film 36a. In the state illustrated in FIG. 6, by the application of the saturation voltage, the majority of the liquid crystal molecules 38, 38, . . . take a normal orientated attitude. However, in the region of the liquid crystal layer, which region is located in the vicinity of each of the base plate 35 and the base plate 36, tilt angles of the liquid crystal molecules 38, 38, . . . are altered little by little. The first phase difference compensating layer 12 of the phase difference compensating device 10 compensates for the phase difference occurring due to the birefringent effects of the liquid crystal molecules 38, 38, . . . , which take the normal orientated attitude. Also, each of the second phase difference compensating layer 13 and the second phase difference compensating layer 14 of the phase difference compensating device 10 compensates for the phase difference occurring due to the birefringent effects of the liquid crystal molecules 38, 38, . . . that are located in the region in which the tilt angles of the liquid crystal molecules 38, 38, . . . are altered little by little, i.e. the liquid crystal molecules 38, 38, . . . , which take the hybrid orientation.

Figure 7:
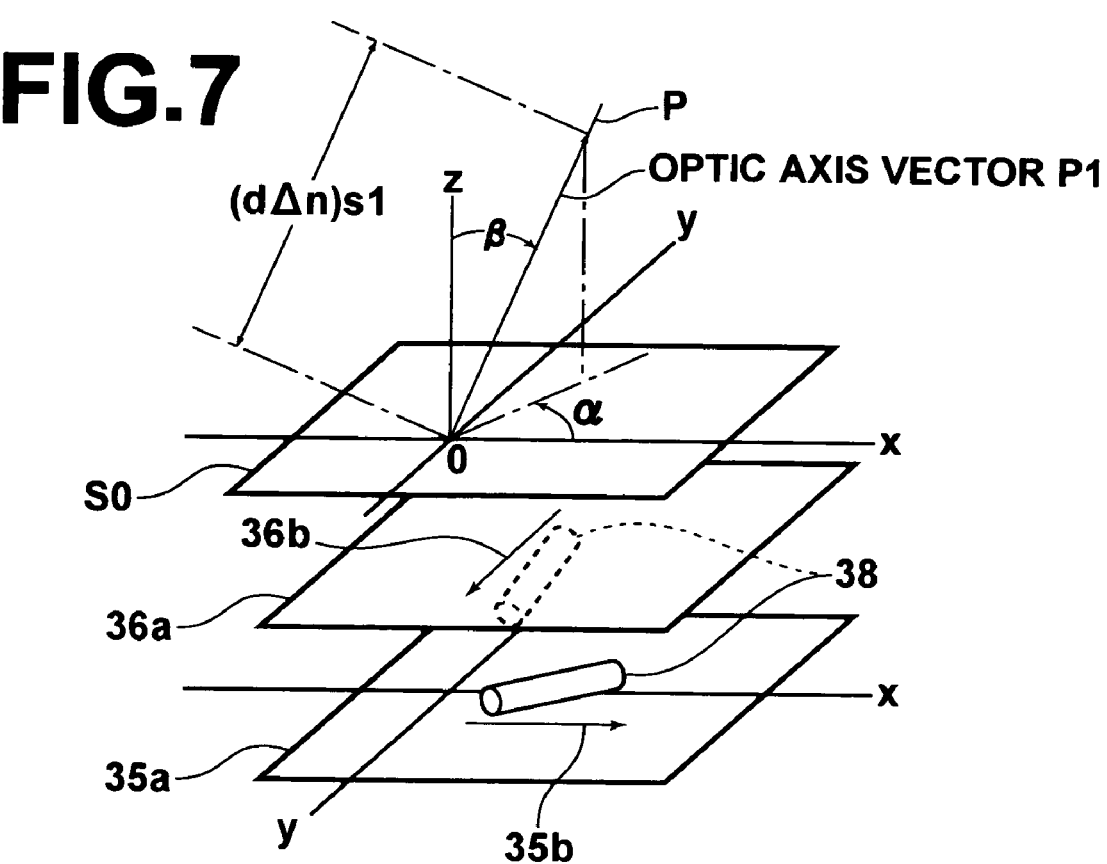
FIG. 7 is an explanatory view showing an optic axis vector defined with respect to an oblique incidence vacuum deposited film.

The direction of orientation of the liquid crystal molecules 38, 38, . . . is determined by the direction of rubbing processing, which is performed for the production of each of the orientating film 35a and the orientating film 36a. As illustrated in FIG. 7, the orientating film 35a is subjected to the rubbing processing in the direction indicated by the arrow 35b, and the orientating film 36a is subjected to the rubbing processing in the direction indicated by the arrow 36b. The direction of orientation of the liquid crystal molecules 38, 38, . . . is determined by each of the directions of the rubbing processing. In FIG. 7, the direction of the rubbing processing performed on the orientating film 35a, i.e. the direction of orientation imparted by the orientating film 35a to the liquid crystal molecules 38, 38, . . . , is matched in parallel with the x axis, and the plane of vacuum evaporation S0 for the oblique incidence vacuum deposited film of each of the second phase difference compensating layer 13 and the second phase difference compensating layer 14 is illustrated together. In such cases, the azimuthal angle α of the direction of vacuum evaporation P represents the angle taken in the counter-clockwise direction from the direction of orientation imparted to the liquid crystal molecules 38, 38, . . . . In cases where the direction of orientation imparted by the orientating film 36a is taken as a reference, the azimuthal angle α of the direction of vacuum evaporation P has the relationship substantially identical with the relationship described above.

The direction of vacuum evaporation P coincides with the birefringent effect-free optic axis of the oblique incidence vacuum deposited film of the second phase difference compensating layer 13. Therefore, with respect to the oblique incidence vacuum deposited film of the second phase difference compensating layer 13, an optic axis vector P1 is capable of being defined in accordance with the direction of vacuum evaporation P, which is defined by the azimuthal angle α and the polar angle β with an origin O being taken as a basic point, and the value of a retardation $(d\Delta n)_{S1}$, which is determined by the birefringent index Δn and the film thickness d of the oblique incidence vacuum deposited film. Also, in the same manner, with respect to the oblique incidence vacuum deposited film of the second phase difference compensating layer 14, an optic axis vector P2 is capable of being defined. Ordinarily, from a combination of a value of a retardation $(d\Delta n)_{Si}$, an azimuthal angle $\alpha_i$, and a polar angle $\beta_i$, an optic axis vector Pi may be represented by the formula:

$$Pi(x, y, z) = ((d\Delta n)_{si} \times \cos\alpha_i \times \sin\beta_i,$$
$$(d\Delta n)_{si} \times \sin\alpha_i \times \sin\beta_i,$$
$$(d\Delta n)_{si} \times \cos\beta_i)$$

Also, a composite vector A, which is composed from the optic axis vectors Pi, may be represented by the formula:

$$A = \Sigma Pi$$

In such cases, the composite vector A corresponds to an optic axis vector obtained from a weighted mean calculation, in which the optic axis vectors defined with respect to a plurality of the oblique incidence vacuum deposited films are weighted with the corresponding values of the retardations $(d\Delta n)_{Si}$.

The second phase difference compensating layer 13 and the second phase difference compensating layer 14 are capable of being designed in various ways in accordance with how the optic axis vector P1, which is defined with respect to the oblique incidence vacuum deposited film of the second phase difference compensating layer 13, and the optic axis vector P2, which is defined with respect to the oblique incidence vacuum deposited film of the second phase difference compensating layer 14, are determined, and in accordance with how the value of the retardation $(d\Delta n)_{Si}$, the azimuthal angle $\alpha_i$, and the polar angle $\beta_i$ with respect to each of the oblique incidence vacuum deposited films are selected for the acquisition of each of the optic axis vector P1 and the optic axis vector P2. In the present invention, in order for the second phase difference compensating layer 13 and the second phase difference compensating layer 14 to be optimized, x and y coordinate values (Ax, Ay) of the composite vector A, which has been projected by orthographic projection onto the plane of vacuum evaporation S0, are employed as criteria for evaluation.

Figure 8:
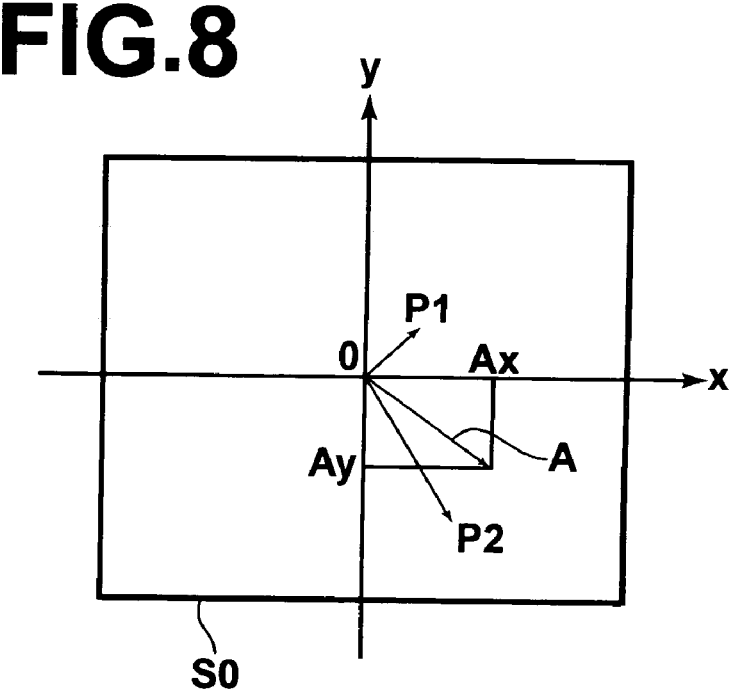
FIG. 8 is an explanatory view showing a composite vector, which is composed from optic axis vectors defined with respect to oblique incidence vacuum deposited films.

Specifically, as illustrated in FIG. 8, the composite vector A is composed from the optic axis vector P1, which is defined with respect to the oblique incidence vacuum deposited film of the second phase difference compensating layer 13, and the optic axis vector P2, which is defined with respect to the oblique incidence vacuum deposited film of the second phase difference compensating layer 14. Also, the composite vector A is projected by orthographic projection onto the plane of vacuum evaporation S0. In such cases, the composite vector A is adjusted such that the values (Ax, Ay) of the x and y coordinate components of the composite vector A satisfy the conditions:

$-100\text{nm} \leq Ax \leq 100\text{nm}$, and at the same time, $-200\text{nm} \leq Ay \leq -50\text{nm}$ (Conditional Formula 1)

In the cases of the TN liquid crystal display device 5, the proportion of the liquid crystal molecules 38, 38, . . . , which take the normal orientated attitude, alters in accordance with the saturation voltage applied for the dark state displaying. The first phase difference compensating layer 12 described above compensates for the optical anisotropy due to the birefringent effect of the liquid crystal molecules 38, 38, . . . , which take the normal orientated attitude. Therefore, the retardation obtained with the first phase difference compensating layer 12 is set at a large value in cases where the proportion of the liquid crystal molecules 38, 38, . . . , which take the normal orientated attitude at the time of the application of the saturation voltage, is large. Also, as in the cases of the liquid crystal molecules 38, 38, . . . , each of the second phase difference compensating layer 13 and the second phase difference compensating layer 14 has a positive birefringent index. Therefore, at the time of the dark state displaying, besides the liquid crystal molecules 38, 38, . . . , the second phase difference compensating layer 13 and the second phase difference compensating layer 14 cause a positive retardation to occur. Accordingly, in cases where the negative retardation obtained with the first phase difference compensating layer 12 is to be determined, it is necessary for the thicknesses of the second phase difference compensating layer 13 and the second phase difference compensating layer 14 to be taken into consideration.

From the foregoing, in cases where the value of the negative retardation d1Δn1, which is obtained with the first phase difference compensating layer 12, is represented as a relationship with a value of a positive retardation $(d\Delta n)_{LC}$, which is obtained with the TN liquid crystal display device 5, the value of the negative retardation d1Δn1, which is obtained with the first phase difference compensating layer 12, should preferably satisfy the relationship:

$-2 \times (d\Delta n)_{LC} \leq d1\Delta n1 \leq -0.5 \times (d\Delta n)_{LC}$ (Conditional Formula 2)

The first phase difference compensating layer 12 will further be illustrated hereinbelow. It has been known that a material constituted of thin films having a refractive index n1 and a physical film thickness "a" and thin films having a refractive index n2 and a physical film thickness "b," which thin films are overlaid alternately at a pitch (a+b) sufficiently shorter than a light wavelength, acts as a structural birefringent material having a negative birefringent index Δn. In cases where an electromagnetic wave impinges from a normal direction upon the structural birefringent material, the electromagnetic wave becomes only the wave (i.e., the TE wave), which has the characteristics such that the electric field vibrates in parallel with the plane of each layer, the structural birefringent material does not exhibit the birefringent characteristics. In cases where the electromagnetic wave impinges upon the structural birefringent material from a direction oblique with respect to the plane of each layer, an effective refractive index $N_{TE}$ with respect to the wave (i.e., the TE wave component), which has the characteristics such that the electric field vibrates in parallel with the plane of each layer, and an effective refractive index $N_{TM}$ with respect to the wave (i.e., the TM wave component), which has the characteristics such that the electric field vibrates in the direction normal to the plane of each layer, vary from each other. It has been known that the effective refractive index $N_{TE}$ and the effective refractive index $N_{TM}$ may be represented by the formulas shown below.

$N_{TE} = \sqrt{\{(an_1^2 + bn_2^2)/(a+b)\}}$ $N_{TM} = \sqrt{[(a+b)/\{(a/n_1^2) + (b/n_2^2)\}]}$ The difference between the effective refractive index $N_{TE}$ and the effective refractive index $N_{TM}$ acts as a factor for causing the birefringent characteristics to occur. The birefringent index Δn of the structural birefringent material may be represented by the formula $\Delta n = N_{TM} - N_{TE}$.

As clear from the formulas shown above, the birefringent index Δn1 of the first phase difference compensating layer 12 is capable of being adjusted by the selection of the refractive index n1 and the physical film thickness "a" of one of the two kinds of the vacuum deposited films and the refractive index n2 and the physical film thickness "b" of the other kind of the vacuum deposited film. Also, the physical film thickness d1 of the entire first phase difference compensating layer 12 is capable of being adjusted by the total number of the two kinds of the vacuum deposited films overlaid one upon another. Therefore, in cases where appropriate deposition materials are selected from deposition materials, which have light transmission characteristics and a good vacuum evaporation capability, and a film designing is made by use of the appropriate deposition materials, the value of the retardation d1Δn1 obtained with the first phase difference compensating layer 12 is capable of being set to be close to the value of the retardation $(d\Delta n)_{LC}$ obtained with the TN liquid crystal display device.

In the foregoing, as an aid in facilitating the explanation, the azimuthal angle α of each of the oblique incidence vacuum deposited film constituting the second phase difference compensating layer 13 and the oblique incidence vacuum deposited film constituting the second phase difference compensating layer 14 is represented as the angle made with the direction of the rubbing processing, which is performed on each of the orientating films of the TN liquid crystal display device, being taken as a reference direction. However, since the phase difference compensating effect of each of the second phase difference compensating layer 13 and the second phase difference compensating layer 14 is rotationally symmetric with respect to the direction of rotation around the optical axis of the light incident from the normal direction upon the TN liquid crystal display device, the azimuthal angle α may be represented as an angle made with any direction being taken as a reference direction. However, it is necessary that the azimuthal angle α of each of the oblique incidence vacuum deposited film constituting the second phase difference compensating layer 13 and the oblique incidence vacuum deposited film constituting the second phase difference compensating layer 14 does not coincide with the direction of the rubbing processing performed on each of the orientating films of the TN liquid crystal display device.

Also, basically, it is necessary for the value of the retardation, which is imparted to the first phase difference compensating layer 12, to be selected in accordance with the positive birefringent index of the liquid crystal molecules 38, 38, . . . and the thickness of the liquid crystal layer. However, as for certain kinds of the TN liquid crystal display devices, the proportion of the liquid crystal molecules 38, 38, . . . , which take the normal orientated attitude at the time of the application of the voltage, is not necessarily be equal to a predetermined value. Therefore, it is necessary for the value of the retardation, which is obtained with the first phase difference compensating layer 12, to be adjusted with the aforesaid proportion being taken into consideration. It is also necessary for the value of the retardation, which is obtained with the first phase difference compensating layer 12, to be adjusted with the positive birefringent indexes with the second phase difference compensating layer 13 and the second phase difference compensating layer 14 being taken into consideration.

Further, besides the light radiating surface side of the TN liquid crystal display device, the phase difference compensating device in accordance with the present invention may be located on the light incidence surface side of the TN liquid crystal display device.

In cases where the reference light wavelength is set at, for example, 550 nm at the time of the preparation of the second phase difference compensating layers, the phase difference compensating device in accordance with the present invention is capable of being employed in a full color, direct viewing type of a display apparatus in which a single TN liquid crystal display device is utilized as the displaying device. However, the birefringent effects of the liquid crystal molecules and the phase difference compensating device vary for different light wavelengths, and therefore the film constitution of the phase difference compensating device should preferably be altered for each of the reference light wavelengths of color component light beams. In such cases, since micro color filters for transmitting red light, green light, and blue light, respectively, are ordinarily incorporated in the TN liquid crystal display device, three kinds of the phase difference compensating devices having different film constitutions may be utilized for the respective filter elements.

Figure 9:
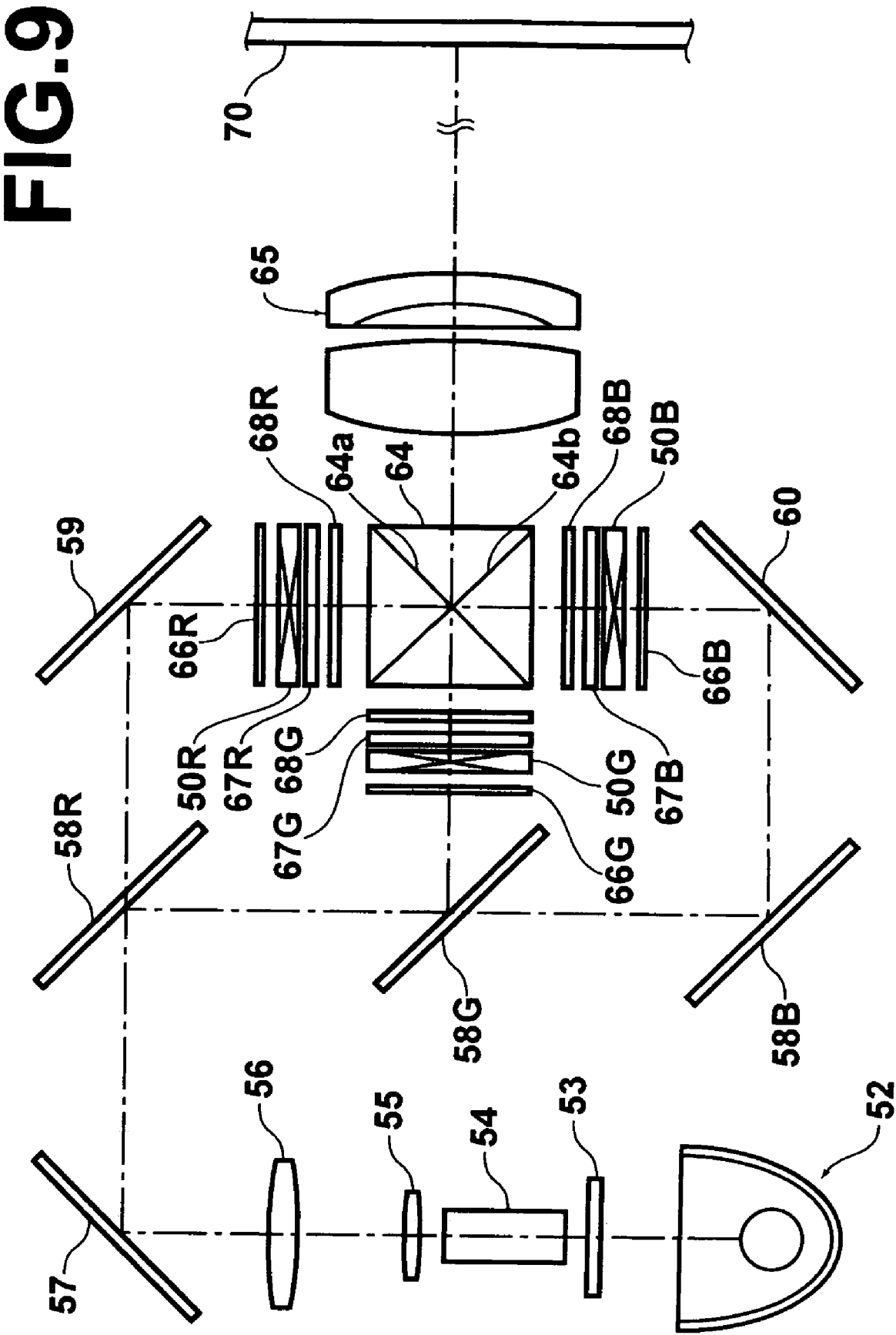
FIG. 9 is a schematic view showing a triple type of a color liquid crystal projector, in which the phase difference compensating devices in accordance with the present invention are employed.

Particularly, the alteration of the film constitution of the phase difference compensating device in accordance with the reference light wavelength of each of the color component light beams is capable of being performed efficiently in the cases of triple type of a color liquid crystal projector, in which three TN liquid crystal display devices are utilized respectively for the color component light beams. FIG. 9 is a schematic view showing a triple type of a color liquid crystal projector, in which the phase difference compensating devices in accordance with the present invention are employed.

With reference to FIG. 9, black-and-white images, which have different transmission densities in accordance with images of the red, green, and blue color component light beams, are displayed by three liquid crystal display devices 50R, 50G, and 50B, respectively. Light having been produced by a light source 52 passes through a filter 53 for filtering out ultraviolet light and infrared light and is thus radiated out from the filter 53 as white light, which contains the red light, the green light, and the blue light. The thus obtained white light travels along the optical axis extending from the light source 52 toward the liquid crystal display devices 50R, 50G, and 50B and impinges upon an integrator 54, which is constituted of glass rod. A light incidence surface of the integrator 54 is located at a position in the vicinity of a focal point of a parabolic mirror of the light source 52, and the light coming from the light source 52 impinges upon the integrator 54 with a high efficiency.

Also, a relay lens 55 is located on the light radiating surface side of the integrator 54. The white light having been radiated out from the integrator 54 is collimated by the relay lens 55 and a collimator lens 56. The white light having thus been collimated impinges upon a mirror 57. The white light having been reflected from the mirror 57 is split into two light beams by a dichroic mirror 58R, which transmits only the red light. The red light, which has passed through the dichroic mirror 58R, is reflected from a mirror 59 and impinges upon the liquid crystal display device 50R from the rear surface of the liquid crystal display device 50R. Also, the light, which contains the green light and the blue light and has been reflected from the dichroic mirror 58R, is split into two light beams by a dichroic mirror 58G, which reflects only the green light. The green light, which has been reflected from the dichroic mirror 58G, impinges upon the liquid crystal display device 50G from the rear surface of the liquid crystal display device 50G. The blue light, which has passed through the dichroic mirror 58G, is reflected from a mirror 58G and a mirror 60 and impinges upon the liquid crystal display device 50B from the rear surface of the liquid crystal display device 50B.

Each of the liquid crystal display devices 50R, 50G, and 50B is constituted of a TN liquid crystal display device. A composing prism 64 is located such that a center point of the composing prism 64 coincides with a position, which is spaced by optically equal distances from the liquid crystal display devices 50R, 50G, and 50B. Also, a projecting lens 65 is located so as to stand facing a light radiating surface of the composing prism 64. The composing prism 64 has two dichroic surfaces 64a and 64b, which are located within the composing prism 64. The composing prism 64 combines the red light, which has passed through the liquid crystal display device 50R, the green light, which has passed through the liquid crystal display device 50G, and the blue light, which has passed through the liquid crystal display device 50B, with one another. The thus obtained composite light impinges upon the projecting lens 65. The projecting lens 65 is located, such that its object side focal surface coincides with the light radiating surfaces of the liquid crystal display devices 50R, 50G, and 50B, and such that its image surface side focal surface coincides with a screen 70. The full color image, which has been composed by the composing prism 64, is thus projected and formed as an image on the screen 70.

Polarizing plates 66R, 66G, and 66B are located on the light incidence surface sides of the liquid crystal display devices 50R, 50G, and 50B, respectively. Also, phase difference compensating devices 67R, 67G, and 67B in accordance with the present invention are located on the light radiating surface sides of the liquid crystal display devices 50R, 50G, and 50B, respectively. Further, polarizing plates 68R, 68G, and 68B are located on the light radiating surface sides of the liquid crystal display devices 50R, 50G, and 50B, respectively. The polarizing plate 66R, which is located on the light incidence surface side of the liquid crystal display device 50R, and the polarizing plate 68R, which is located on the light radiating surface side of the liquid crystal display device 50R, are set in the crossed Nicols arrangement. Also, the polarizing plate 66G, which is located on the light incidence surface side of the liquid crystal display device 50G, and the polarizing plate 68G, which is located on the light radiating surface side of the liquid crystal display device 50G, are set in the crossed Nicols arrangement. Further, the polarizing plate 66B, which is located on the light incidence surface side of the liquid crystal display device 50B, and the polarizing plate 68B, which is located on the light radiating surface side of the liquid crystal display device 50B, are set in the crossed Nicols arrangement. Each of the polarizing plates 66R, 66G, and 66B, which are located on the light incidence surface sides of the liquid crystal display devices 50R, 50G, and 50B, respectively, acts as a polarizer. Each of the polarizing plates 68R, 68G, and 68B, which are located on the light radiating surface sides of the liquid crystal display devices 50R, 50G, and 50B, respectively, acts as an analyzer. Further, as described above, each of the phase difference compensating devices 67R, 67G, and 67B is provided with the first phase difference compensating layer and the second phase difference compensating layers. Each of the phase difference compensating devices 67R, 67G, and 67B compensates for the phase difference occurring due to the corresponding one of the liquid crystal display devices 50R, 50G, and 50B located for the color channels.

The liquid crystal display devices 50R, 50G, and 50B are constituted of identical types of the TN liquid crystal display devices. Ordinarily, it has been known that the retardation $(d\Delta n)_{LC}$ of a TN liquid crystal display device varies in accordance with the light wavelengths. FIG. 10 is a table showing dependence of a retardation, which is obtained with a TN liquid crystal display device provided with a liquid crystal layer having a thickness d of 4.5 μm, upon light wavelengths. As illustrated in FIG. 10, the birefringent index Δn of the liquid crystal layer varies in accordance with the light wavelengths, and the retardation $(d\Delta n)_{LC}$ of the TN liquid crystal display device varies in accordance with the light wavelengths. In FIG. 10, "Re" represents the effective retardation that is obtained in cases where the proportion of the liquid crystal molecules, which take the normal orientated attitude at the time of the application of the voltage across the liquid crystal layer, is 70%. The first phase difference compensating layer described above acts to compensate for the positive phase difference due to the effective retardation Re. The proportion of the liquid crystal molecules, which take the normal orientated attitude at the time of the application of the voltage across the liquid crystal layer, varies in accordance with various factors, such as the structure of the TN liquid crystal layer, the liquid crystal thickness, the liquid crystal density, and the saturation voltage value. Therefore, the aforesaid proportion is not necessarily limited to 70%.

FIG. 11 is a table showing dependence of a retardation, which is obtained with a first phase difference compensating layer, upon light wavelengths. Specifically, in this example, in order for the effective retardation Re, which is obtained with the aforesaid TN liquid crystal display device, to be efficiently compensated for, the first phase difference compensating layer is constituted of 40 $TiO_2$ layers, each of which has a physical film thickness of 30 nm, and 40 $SiO_2$ layers, each of which has a physical film thickness of 20 nm. The 40 $TiO_2$ layers and, the 40 $SiO_2$ layers are alternately overlaid one upon another. The first phase difference compensating layer is thus constituted of 80 layers in total. In FIG. 11, the absolute values of the negative retardation d1Δn1 obtained with the thus formed first phase difference compensating layer are shown. Since the refractive indexes of the $TiO_2$ layers and the $SiO_2$ layers, which act as the deposition materials, have the dependence upon light wavelengths, the dependence upon light wavelengths also occurs with the retardation d1Δn1. The first phase difference compensating layer is designed so as to perform good phase difference compensation with respect to a light wavelength of 550 nm, which corresponds to a high visual sensitivity in the visible light wavelength region. FIG. 12 is a graph showing retardation characteristics of the TN liquid crystal display device and the first phase difference compensating layer. As illustrated in FIG. 12, it is capable of being found that, with the first phase difference compensating layer described above, the effect of the phase difference compensation is not very large with respect to the light wavelengths on the short wavelength side.

Therefore, in this example, the thicknesses of the first phase difference compensating layers in the phase difference compensating devices 67R, 67G, and 67B for the respective color channels are set at different values. An example of the setting of the thicknesses of the first phase difference compensating layers is illustrated in FIG. 13. The setting of the thicknesses of the first phase difference compensating layers is made by the utilization of the features of the first phase difference compensating layer, which is constituted of the vacuum deposited films having the film thicknesses sufficiently smaller than the light wavelengths, i.e., the features such that the negative birefringent index Δn1 is determined by the refractive indexes of the two kinds of the vacuum deposited films and the ratio between the film thicknesses of the two kinds of the vacuum deposited films, and such that the value of the retardation d1Δn1 is capable of being adjusted with the adjustment of the total film thickness of the first phase difference compensating layer (i.e., the total number of the layers constituting the first phase difference compensating layer), which total film thickness is to be multiplied by the birefringent index Δn1.

In the example of FIG. 13, the thicknesses of the first phase difference compensating layers are altered with respect to the blue light, the green light, and the red light. With respect to each of the color channels, the first phase difference compensating layer is constituted of the two kinds of the vacuum deposited films, i.e. the $TiO_2$ layers, each of which has a physical film thickness of 30 nm, and the $SiO_2$ layers, each of which has a physical film thickness of 20 nm. However, with respect to the first phase difference compensating layer for the blue light, the first phase difference compensating layer is constituted of 72 layers in total and has the total film thickness d1 of 1.8 μm so as to match with the effective retardation Re (=413 nm) of the TN liquid crystal display device with respect to the reference light wavelength λ of 450 nm, which is approximately equal to the middle value of the wavelengths of the blue color component light beam. Also, the first phase difference compensating layer for the green light is constituted of 80 layers in total and has the total film thickness d1 of 2.0 μm with respect to the reference light wavelength λ of 550 nm. Further, the first phase difference compensating layer for the red light is constituted of 82 layers in total and has the total film thickness d1 of 2.1 μm with respect to the reference light wavelength λ of 650 nm.

Figure 14:
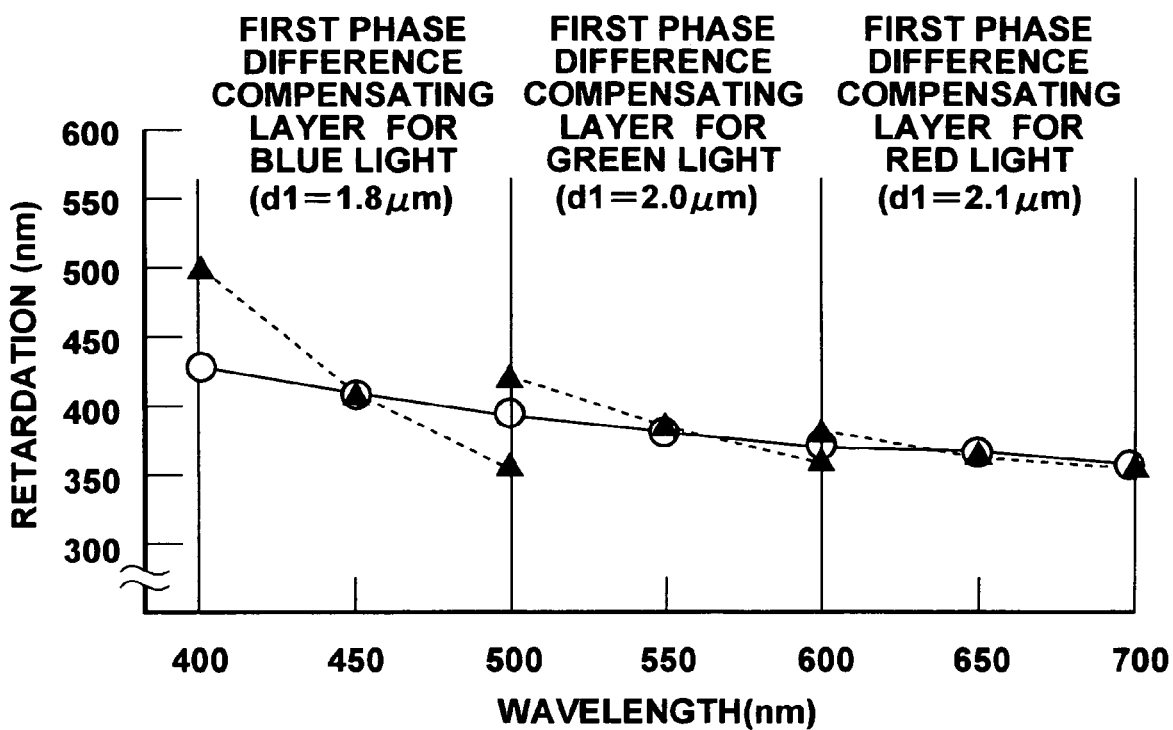
FIG. 14 is a graph showing retardation characteristics of the improved first phase difference compensating layer.

As a result, as illustrated in FIG. 14, it is capable of being found that each of the retardations, which are obtained with the liquid crystal display devices 50R, 50G, and 50B for the respective color channels, is capable of being appropriately compensated for with respect to each of the wavelength regions of the color component light beams. Therefore, for example, in cases where a background of the blue color alone is to be projected onto the entire area of the screen 70, the entire area of the liquid crystal display device 50B is set at the bright state displaying, and the entire areas of the remaining liquid crystal display devices 50R and 50G are set at the dark state displaying. In such cases, the positive phase difference occurring due to the birefringent effect of the liquid crystal molecules, which take the normal orientated attitude in each of the liquid crystal display devices 50R and 50G due to the application of the saturation voltage, is appropriately compensated for by the negative retardation, which is obtained with the corresponding one of the first phase difference compensating layer for the red light in the phase difference compensating device 67R and the first phase difference compensating layer for the green light in the phase difference compensating device 67G. Therefore, little light is radiated out from the polarizing plates 68R and 68G, which act as the analyzers. Accordingly, a clear background of the blue color alone, which background is free from color staining, is capable of being projected onto the screen 70.

With the same effect as that described above, the contrast ratio between when the white light is projected to the entire area of the screen 70 and when the entire area of the screen 70 is set in the totally dark state is capable of being improved from the conventional ratio of 500:1 to a ratio of 700:1. Also, in the cases of the projection of an ordinary full color image, the black is capable of being tightened, and the image sharpness is capable of being enhanced. As clear from FIG. 14, the dependence of each of the retardation, which is obtained with the first phase difference compensating layer for the green light, and the retardation, which is obtained with the first phase difference compensating layer for the red light, upon light wavelengths is lower than the dependence of the retardation, which is obtained with the first phase difference compensating layer for the blue light, upon light wavelengths. Therefore, each of the first phase difference compensating layer for the green light and the first phase difference compensating layer for the red light is capable of being constituted of a first phase difference compensating layer having an identical total film thickness. In such cases, it is advantageous that the total film thickness be determined with a light wavelength of 600 nm being taken as a reference light wavelength.

As described above, in cases where the phase difference compensating devices in accordance with the present invention are utilized in the triple type of the color liquid crystal projector, it is efficient that the total film thickness of the first phase difference compensating layer is adjusted for each of at least two kinds of the color channels. In the foregoing, only the dependence of the retardation $(d\Delta n)_{LC}$ of each of the liquid crystal display devices 50R, 50G, and 50B upon light wavelengths is taken into consideration. However, each of the phase difference compensating devices 67R, 67G, and 67B is also provided with the second phase difference compensating layers. Since the reference light wavelength varies for different color channels, the film designing for each of the second phase difference compensating layers is performed in accordance with the reference light wavelength varying for different color channels. As in the cases of the liquid crystal molecules, each of the second phase difference compensating layers has a positive retardation. Therefore, an adjustment of the total film thickness of the first phase difference compensating layer should preferably be made toward a value increased even further. In cases where the adjustment of the total film thickness of the first phase difference compensating layer is thus made toward a value increased even further, the negative retardation, which is obtained with the first phase difference compensating layer corresponding to each of the color channels, should preferably satisfy the relationship represented by Conditional Formula 2 shown above.

It is also possible for each of the phase difference compensating devices 67R, 67G, and 67B to be located on the light incidence surface side of the corresponding one of the liquid crystal display devices 50R, 50G, and 50B. However, it often occurs that a microlens array, which is provided with a plurality of fine microlenses located for respective pixels, is located on the light incidence surface side of each of the liquid crystal display devices, such that a vignetting factor may be enhanced. Ordinarily, in the cases of the liquid crystal display device in which the microlens array is utilized, the angle distribution range of the light, which is incident upon the liquid crystal layer, becomes wider than the angle distribution range of the light, which is incident upon the microlens array at various angles of incidence. Therefore, in order for the efficient operation of the phase difference compensation to be performed, it is advantageous that each of the phase difference compensating devices 67R, 67G, and 67B be located on the light radiating surface side of the corresponding one of the liquid crystal display devices 50R, 50G, and 50B.

Further, in cases where each of the phase difference compensating devices 67R, 67G, and 67B, in which both the first phase difference compensating layer and the second phase difference compensating layers have been optimized with respect to the reference light wavelength in the corresponding color channel, is utilized, it is capable of being expected that the contrast ratio on the screen 70 is enhanced to at least 1,000:1. Furthermore, in cases where the phase difference compensating devices 67R, 67G, and 67B are constituted of the inorganic materials alone, the heat resistance and the light resistance of the phase difference compensating devices 67R, 67G, and 67B are capable of being kept high. Therefore, in such cases, the phase difference compensating devices 67R, 67G, and 67B are capable of being utilized in products, which will be used for a long period of time, such as rear projection television sets for domestic use.

Besides the glass base plate, one of various transparent inorganic materials may be used as the base plate of the phase difference compensating device in accordance with the present invention. Particularly, in cases where the phase difference compensating device in accordance with the present invention is utilized for the liquid crystal projectors, a sapphire base plate, a rock crystal base plate, or the like, may be used as the base plate of the phase difference compensating device in accordance with the present invention. Also, the first phase difference compensating layer and the second phase difference compensating layers may be formed on two independent transparent base plates. Further, a lens, a prism, a filter, or a base plate of a liquid crystal display device, which is incorporated in the optical system, may be utilized as the base plate of the phase difference compensating device in accordance with the present invention. The liquid crystal apparatus in accordance with the present invention is not limited to the liquid crystal projector and may be constituted as a direct viewing type of a liquid crystal display apparatus, or the like.

What is claimed is:

1. A phase difference compensating device, which is adapted to be used in combination with a liquid crystal display device, and which is adapted to compensate for a phase difference occurring due to birefringence of a light beam passing through a liquid crystal layer of the liquid crystal display device, the phase difference compensating device comprising:

i) a first phase difference compensating layer, which is adapted to compensate for the phase difference occurring due to liquid crystal molecules having undergone normal orientation in the liquid crystal layer, ii) two second phase difference compensating layers, which are adapted to compensate for the phase difference occurring due to the liquid crystal molecules having undergone hybrid orientation in the liquid crystal layer, and iii) a first transparent base plate, on which the first phase difference compensating layer and the two second phase difference compensating layers are supported, wherein:

each of the two second phase difference compensating layers is constituted of an oblique incidence vacuum deposited film formed by oblique incidence vacuum evaporation of an inorganic material, the two second phase difference compensating layers are formed on opposite surfaces of the first transparent base plate, and the two second phase difference compensating layers differ from each other in at least one of an azimuthal angle of a direction of vacuum evaporation with respect to a plane of vacuum evaporation of the oblique incidence vacuum deposited film and a polar angle of the direction of vacuum evaporation with respect to the plane of vacuum evaporation of the oblique incidence vacuum deposited film.

2. A phase difference compensating device as defined in claim 1 wherein the first phase difference compensating layer is constituted of inorganic materials.

3. A phase difference compensating device as defined in claim 2, further comprising a second transparent base plate on which at least two additional second phase difference compensating layers are supported, wherein the first transparent base plate and the second transparent base plate are superposed on each other.

4. A phase difference compensating device as defined in claim 2 wherein:

the liquid crystal is a twisted nematic liquid crystal, the azimuthal angles of the two second phase difference compensating layers are set to be different from an orientation azimuthal angle, which is imparted by orientating films of the twisted nematic liquid crystal display device to the liquid crystal molecules in the liquid crystal layer of the twisted nematic liquid crystal display device, x and y coordinate components (Ax, Ay) of a composite vector, which is composed from optic axis vectors defined with respect to the oblique incidence vacuum deposited films of the two second phase difference compensating layers, and which is projected by orthographic projection onto the plane of vacuum evaporation, satisfy the conditions:

$-100$ nm$\leq Ax \leq 100$ nm $-200$ nm$\leq Ay \leq -50$ nm, and each of the optic axis vectors is defined with respect to each of the oblique incidence vacuum deposited films of the two second phase difference compensating layers, and in accordance with a value of a retardation obtained with the oblique incidence vacuum deposited film.

5. A phase difference compensating device as defined in claim 4 wherein:

a retardation d1Δn1, which is obtained with the first phase difference compensating layer, satisfies the relationship:

$-2 \times (d\Delta n)_{LC} \leq d1\Delta n1 \leq -0.5 \times (d\Delta n)_{LC}$, where $(d\Delta n)_{LC}$ is the product of a thickness d of the liquid crystal layer and a birefringent index Δn of the liquid crystal layer.

6. A phase difference compensating device as defined in claim 2 wherein:

the first phase difference compensating layer is constituted of at least one vacuum deposited film of a high refractive index substance and at least one vacuum deposited film of a low refractive index substance, the vacuum deposited films of the first phase difference compensating layer are laminated alternately, and an optical film thickness of each of the vacuum deposited films of the first phase difference compensating layer falls within the range of one-hundredth of a reference light wavelength to one-fifth of the reference light wavelength.

7. A phase difference compensating device as defined in claim 1, further comprising a second transparent base plate on which at least two additional second phase difference compensating layers are supported, wherein the first transparent base plate and the second transparent base plate are superposed on each other.

8. A phase difference compensating device as defined in claim 7 wherein:

the liquid crystal is a twisted nematic liquid crystal, the azimuthal angles of the two second phase difference compensating layers are set to be different from an orientation azimuthal angle, which is imparted by orientating films of the twisted nematic liquid crystal display device to the liquid crystal molecules in the liquid crystal layer of the twisted nematic liquid crystal display device, x and y coordinate components (Ax, Ay) of a composite vector, which is composed from optic axis vectors defined with respect to the oblique incidence vacuum deposited films of the two second phase difference compensating layers, and which is projected by orthographic projection onto the plane of vacuum evaporation, satisfy the conditions:

$-100$ nm$\leq Ax \leq 100$ nm $-200$ nm$\leq Ay \leq -50$ nm, and each of the optic axis vectors is defined with respect to each of the oblique incidence vacuum deposited films of the two second phase difference compensating layers, and in accordance with a value of a retardation obtained with the oblique incidence vacuum deposited film.

9. A phase difference compensating device as defined in claim 8 wherein:

q retardation d1Δn1, which is obtained with the first phase difference compensating layer, satisfies the relationship:

$-2 \times (d\Delta n)_{LC} \leq d1\Delta n1 \leq \times 0.5 \times (d\Delta n)_{LC}$, where $(d\Delta n)_{LC}$ is the product of a thickness d of the liquid crystal layer and a birefringent index Δn of the liquid crystal layer.

10. A phase difference compensating device as defined in claim 7 wherein:

the first phase difference compensating layer is constituted of at least one vacuum deposited film of a high refractive index substance and at least one vacuum deposited film of a low refractive index substance, the vacuum deposited films of the first phase difference compensating layer are laminated alternately, and an optical film thickness of each of the vacuum deposited films of the first phase difference compensating layer falls within the range of one-hundredth of a reference light wavelength to one-fifth of the reference light wavelength.

11. A phase difference compensating device as defined in claim 1 wherein:

the liquid crystal is a twisted nematic liquid crystal, the azimuthal angles of the two second phase difference compensating layers are set to be different from an orientation azimuthal angle, which is imparted by orientating films of the twisted nematic liquid crystal display device to the liquid crystal molecules in the liquid crystal layer of the twisted nematic liquid crystal display device, x and y coordinate components (Ax, Ay) of a composite vector, which is composed from optic axis vectors defined with respect to the oblique incidence vacuum deposited films of the two second phase difference compensating layers, and which is projected by orthographic projection onto the plane of vacuum evaporation, satisfy the conditions:

$-100 \text{ nm} \leq Ax \leq 100 \text{ nm}$ $-200 \text{ nm} \leq Ay \leq -50 \text{ nm}$, and each of the optic axis vectors is defined with respect to each of the oblique incidence vacuum deposited films of the two second phase difference compensating layers, and in accordance with a value of a retardation obtained with the oblique incidence vacuum deposited film.

12. A phase difference compensating device as defined in claim 11 wherein:
a retardation d1Δn1, which is obtained with the first phase difference compensating layer, satisfies the relationship:

$-2 \times (d\Delta n)_{LC} \leq d1\Delta n1 \leq -0.5 \times (d\Delta n)_{LC}$, where $(d\Delta n)_{LC}$ is the product of a thickness d of the liquid crystal layer and a birefringent index Δn of the liquid crystal layer.

13. A phase difference compensating device as defined in claim 1 wherein:
the first phase difference compensating layer is constituted of at least one vacuum deposited film of a high refractive index substance and at least one vacuum deposited film of a low refractive index substance,
the vacuum deposited films of the first phase difference compensating layer are laminated alternately, and
an optical film thickness of each of the vacuum deposited films of the first phase difference compensating layer falls within the range of one-hundredth of a reference light wavelength to one-fifth of the reference light wavelength.

14. A phase difference compensating device as defined in claim 1 wherein an anti-reflection film is formed on at least one of a light incidence side surface and a light radiating side surface of the phase difference compensating device.

15. A liquid crystal apparatus, comprising:
a twisted nematic liquid crystal display device for displaying a projected image, and
a phase difference compensating device as defined in claim 1.

16. A liquid crystal apparatus as defined in claim 15 wherein:
the twisted nematic liquid crystal display device comprises three twisted nematic liquid crystal display devices, each of which displays a projected image with respect to one of three color component light beams,
the liquid crystal apparatus further comprises three phase difference compensating devices, each of which is combined with one of the three twisted nematic liquid crystal display devices, and
the three phase difference compensating devices include at least two kinds of phase difference compensating devices, which vary in retardation in accordance with a reference wavelength of each of the color component light beams.

17. A phase difference compensating device as defined in claim 1 wherein the liquid crystal is a twisted nematic liquid crystal.

18. A phase difference compensating device as defined in claim 17 wherein the first phase difference compensating layer is constituted of inorganic materials.

19. A phase difference compensating device as defined in claim 18 wherein:
the first phase difference compensating layer is constituted of at least one vacuum deposited film of a high refractive index substance and at least one vacuum deposited film of a low refractive index substance,
the vacuum deposited films of the first phase difference compensating layer are laminated alternately, and
an optical film thickness of each of the vacuum deposited films of the first phase difference compensating layer falls within the range of one-hundredth of a reference light wavelength to one-fifth of the reference light wavelength.

20. A phase difference compensating device as defined in claim 17 wherein an anti-reflection film is formed on at least either one of a light incidence side surface and a light radiating side surface of the phase difference compensating device.

* * * * *